(12) United States Patent
Cifra

(10) Patent No.: US 7,958,488 B2
(45) Date of Patent: Jun. 7, 2011

(54) VIRTUAL TESTING IN A DEVELOPMENT ENVIRONMENT

(75) Inventor: Christopher G. Cifra, Austin, TX (US)

(73) Assignee: National Instruments Corporation, Austin, TX (US)

( * ) Notice: Subject to any disclaimer, the term of this patent is extended or adjusted under 35 U.S.C. 154(b) by 979 days.

(21) Appl. No.: 11/462,427

(22) Filed: Aug. 4, 2006

(65) Prior Publication Data

US 2007/0044078 A1    Feb. 22, 2007

Related U.S. Application Data

(60) Provisional application No. 60/708,560, filed on Aug. 16, 2005.

(51) Int. Cl.
*G06F 9/44* (2006.01)

(52) U.S. Cl. ......... 717/106; 717/107; 717/108; 717/109

(58) Field of Classification Search ........... 717/106–109
See application file for complete search history.

(56) References Cited

U.S. PATENT DOCUMENTS

| | | | |
|---|---|---|---|
| 5,353,233 A | 10/1994 | Qian et al. | |
| 6,108,609 A | 8/2000 | Qian et al. | |
| 6,223,134 B1 | 4/2001 | Rust et al. | |
| 2003/0058280 A1* | 3/2003 | Molinari et al. | 345/771 |
| 2005/0035966 A1 | 2/2005 | Pasquarette et al. | |
| 2005/0035967 A1 | 2/2005 | Joffrain et al. | |
| 2005/0039160 A1* | 2/2005 | Santori et al. | 717/104 |
| 2005/0039162 A1 | 2/2005 | Cifra | |
| 2005/0039170 A1* | 2/2005 | Cifra et al. | 717/125 |
| 2005/0086243 A1* | 4/2005 | Abbott et al. | 707/100 |

FOREIGN PATENT DOCUMENTS

EP    1 167 980 A2    1/2002

OTHER PUBLICATIONS

Shim, et al. "Programming Using Dynamic System Modeling Via a 3D-Based Multimodeling Framework", 2005, Proceedings of the 2005 Winter Simulation Conference, p. 1-8.*

(Continued)

*Primary Examiner* — Wei Y Zhen
*Assistant Examiner* — Qamrun Nahar
(74) *Attorney, Agent, or Firm* — Meyertons Hood Kivlin Kowert & Goetzel, P.C.; Jeffrey C. Hood; Mark S. Williams

(57) ABSTRACT

System and method for developing a measurement program that performs a measurement function. A measurement program is created in a development environment in response to first user input, possibly including configuring a physical unit under test (UUT) with one or more parameter values. The measurement program includes icons that visually indicate the measurement function, and is executable to receive signals from the physical (UUT). Second user input is received specifying that the measurement program is to receive simulated data instead of signals from the physical UUT. In response, the development environment is configured to provide the simulated data to the measurement program, possibly including configuring the simulated data according to the parameter value(s). The configuring does not change the measurement program. After the configuration, the measurement program is executed, where during execution the measurement program receives the simulated data and performs the measurement function on the simulated data.

43 Claims, 17 Drawing Sheets

OTHER PUBLICATIONS

"LabVIEW Simulation Module User Manual"; Chapter 1 Introduction to Modeling; Apr. 2004; 38 pages; National Instruments Corporation; Austin, TX.

"Simulink—Model-Based and System-Based Design—Using Simulink Version 5"; Oct. 2004; 484 pages; The MathWorks, Inc.; Natick, MA.

"Getting Started with LabVIEW"; Apr. 2003; 70 pages; National instruments Corporation; Austin, TX.

"LabVIEW—Real-Time Module User Manual"; Apr. 2004 Edition; 72 pages; National instruments Corporation; Austin, TX.

"SignalExpress: Getting Started with SignalExpress"; Aug. 2004; 38 pages; National instruments Corporation; Austin, TX.

International search report and written opinion for application No. PCT/US2006/032034 mailed Mar. 23, 2007, p. 1-15.

* cited by examiner

VIRTUAL TESTING IN A DEVELOPMENT ENVIRONMENT

PRIORITY DATA

This application claims benefit of priority to U.S. Provisional Application Ser. No. 60/708,560, titled "Virtual Testing In A Mixed Signal Analysis System", filed Aug. 16, 2005, whose inventor was Christopher G. Cifra, and which is incorporated by reference in its entirety as though fully and completely set forth herein.

FIELD OF THE INVENTION

The present invention relates to the field of analysis, and more particularly to a system and method for interactively specifying and performing analysis functions that utilizes hardware simulation for virtual testing.

DESCRIPTION OF THE RELATED ART

Traditionally, high level text-based programming languages have been used by programmers in writing application programs. Many different high level text-based programming languages exist, including BASIC, C, C++, Java, FORTRAN, Pascal, COBOL, ADA, APL, etc. Programs written in these high level text-based languages are translated to the machine language level by translators known as compilers or interpreters. The high level text-based programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

To overcome the above shortcomings, various graphical programming environments now exist which allow a user to construct a graphical program or graphical diagram, also referred to as a block diagram. U.S. Pat. Nos. 4,901,221; 4,914,568; 5,291,587; 5,301,301; and 5,301,336; among others, to Kodosky et al disclose a graphical programming environment which enables a user to easily and intuitively create a graphical program. Graphical programming environments such as that disclosed in Kodosky et al can be considered a higher and more intuitive way in which to interact with a computer. A graphically based programming environment can be represented at a level above text-based high level programming languages such as C, Basic, Java, etc.

A user may assemble a graphical program by selecting various icons or nodes which represent desired functionality, and then connecting the nodes together to create the program. The nodes or icons may be connected by lines representing data flow between the nodes, control flow, or execution flow. Thus the block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program, and may include other icons which represent devices being controlled.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

In parallel with the development of the graphical programming model, increasingly, much of the instrumentation related to the above fields of application, e.g., test and measurement, data acquisition, process control, etc., has been implemented as virtual instruments (VIs). A virtual instrument is a user-defined measurement and automation system that includes a computer (such as a standard personal computer) or workstation equipped with the application software (such as LabVIEW graphical programs), hardware (such as DAQ boards, or more specialized hardware boards, e.g., oscilloscope boards, arbitrary waveform generator boards, etc.), and driver software. Virtual instrumentation represents a fundamental shift from traditional hardware-centered instrumentation systems to software-centered systems that exploit the computational, display, productivity and connectivity capabilities of computers, networks and the Internet. Because virtual instruments exploit these computation, connectivity, and display capabilities, users can define and change the functionality of their instruments, rather than being restricted by fixed-functions imposed by traditional instrument vendors. Virtual instruments may be used to monitor and control traditional instruments, create computer-based systems that can replace traditional instruments at a lower cost, and develop systems that integrate measurement functionality with industrial automation. Additionally, giving users flexibility to create their own user-defined virtual instruments for an increasing number of applications in a wide variety of industries, and letting users leverage the latest technologies from computers, networking and communications generally shortens system development time and reduces both short- and long-term costs of developing, owning and operating measurement and automation systems, and may generally improve efficiency and precision of applications spanning research, design, production and service.

Virtual instruments may thus effectively replace many traditional standalone hardware-based instruments, such as, for example, oscilloscopes, multi-meters, and so forth. Such virtual instruments provide a number of benefits over their hardware equivalents, such as, for example, lower cost of manufacture and distribution and ease of upgrades, among others. An exemplary virtual instrument system is the National Instruments' LabVIEW system, where, for example, graphical interfaces or "front ends" of various instruments, such as oscilloscopes, multi-meters, and arbitrary waveform generators, execute on a host computer system, often in conjunction with data acquisition (DAQ) hardware or other specialized boards, e.g., oscilloscope boards, multi-meter boards, and arbitrary waveform generator boards, etc., to provide respective functionality traditionally provided by standalone hardware devices. In some virtual instruments, some or all of the instrument functionality is implemented in software and executed on the host computer. Thus, a virtual instrument may be implemented completely in software (e.g., a "softscope"), or may implemented in both software and hardware, in contrast with traditional standalone hardware instruments.

In some signal analysis applications, such as test and measurement, control, simulation, equipment design, etc., numerous instruments may be required to analyze various signals related to the application. The coordinated configuration and use of these instruments to perform the desired tasks of the application generally requires significant effort, e.g., custom programming and/or coordinated configuration of the devices, and thus is often tedious, time-consuming, and error prone.

A signal analysis development environment, such as Signal Express™, provided by National Instruments Corporation, provides another convenient and powerful means for specifying and performing such signal analysis. FIG. 1A illustrates a typical GUI of a prior art version of this product. As FIG. 1A shows, the GUI may include an area or window for displaying a plurality of function blocks, here shown as the left-most window of the GUI. The display window may be referred to as a display tool and may comprise a graph or a table as desired. The displayed function blocks may each correspond to a respective signal operation that has been selected by a user and thus may represent the currently specified operations, where each function block has an icon, a label, and icons for input and/or output signals. The operations may thus specify or implement a signal analysis function or task.

The selectable operations may include any type of operation related to signals. For example, the operations may include: generating one or more signals, e.g., by reading one or more signals from a file, and/or synthesizing one or more signals algorithmically; receiving one or more signals from an external source; sending one or more signals to an external system; analyzing one or more signals and generating results based on the analysis; displaying one or more signals; displaying results of another operation; processing one or more signals, thereby generating one or more modified signals; and storing one or more signals, among others. In other words, the operations may include signal generation, acquisition, analysis, processing, storage, import, export, or transmission, among others.

Additionally, some of the operations may utilize various instruments to perform their respective functionalities. The signal analysis function development environment provides an integrated interface to a plurality of instruments, where the instruments may include virtual instruments (which may or may not include respective hardware boards), and optionally, standalone hardware instruments. For example, receiving signals from an external source may include receiving signals from a hardware device over a transmission medium, or from a simulation. As another example, a first operation may generate a test signal, e.g., via a virtual arbitrary waveform generator, and export the signal to an external hardware device, such as a filter. The filter may process (filter) the signal and a resultant (filtered) signal may be received by a second operation, e.g., a virtual oscilloscope, which may then display the resultant signal, e.g., compared with the original test signal. Note that the virtual arbitrary waveform generator and/or the virtual oscilloscope may be implemented solely in software, or may be include both software and a hardware board. Examples of hardware boards used in the signal analysis system include: an E Series Multifunction DAQ (E-MIO), a High Speed Digitizer (Scope), and a Signal Sources (Arbitrary Waveform & Function Generators), as provided by National Instruments Corporation, as well as an S Series Multifunction DAQ (S-MIO) board, a High-Speed Digital (DIO) board, and a Digital Multimeter (DMM) board, among others.

Thus, the instruments to which access may be provided by the signal analysis function development environment may include virtual instruments, such as a DAQ (data acquisition) device, a digitizer, an arbitrary waveform generator (arb), a digital I/O device, and a digital multimeter, among others, some of which may include corresponding hardware, such as a DAQ board, scope (digitizer) board, an arb board, a digital I/O board, and a digital multimeter board, etc., as described above, and may optionally also include at least one standalone hardware-based instrument, such as, for example, a standalone oscilloscope, multi-meter, waveform generator, hardware filter, etc.

Thus, the signal analysis function development environment may provide access to a plurality of instruments, where the plurality of instruments includes two or more virtual instruments, and may optionally include one or more standalone hardware devices. Generally the performance of the operation results in some form of output, such as, for example, signal data (a signal) or other resultant data that may then be displayed in a display tool of the GUI, e.g., in a graph (e.g., for signal plots) or in a table (e.g., for tabular scalar data). For each operation, one or more input signals for the operation may be displayed. More generally, as described below, in a preferred embodiment, the signal analysis function may include a plurality of operations, each of which may include one or more input signals and/or one or more output signals, and so any of the input and/or output signals may be displayed.

As shown, the input and output signal icons for each function block may be displayed in a manner that indicates whether the signal is an input or an output for that block. For example, the signal icons at the bottom of most of the function blocks each have a graphical "I/O" icon comprising a vertical line and a triangle, placed either to the upper left of the vertical line, indicating input, or to the lower right of the line, indicating output.

The function blocks are included in a function block diagram, where a plurality of function block icons are arranged to visually indicate the signal analysis function. In other words, a diagram including the function block icons of the specified operations is displayed, where the diagram visually indicates the functionality of the signal analysis function. In this example, the function block diagram is presented as a vertical linear sequence of function blocks, where the respective signal operations are performed accordingly, although it should be noted that, as mentioned above, each of the operations is executed in a substantially continuous manner. Thus, the linear sequence may indicate the general data flow between the function blocks.

As FIG. 1A shows, a display area of the GUI is provided (shown to the right of the function blocks) for displaying signals and related data, and is used to display signal graphs, as well as tabular data. As also shown, a menu or tool bar is provided along the top of the GUI whereby the user may invoke functionality to control execution of the operations, generate code, set triggers and timing, and so forth. The signal analysis development environment may support a "Execute Continuously" mode in which the environment executes each operation in a substantially continuous manner upon selection of the operation by the user.

A user selects each operation and may configure each operation via one or more configuration dialogs, e.g., specifying operation parameters, I/O for the operation, and so forth. A Step Setup mode may be used primarily during configuration of the respective function blocks. More specifically, the Step Setup mode may operate to display configuration GUIs for the respective function blocks facilitating user configuration of the function blocks, i.e., the signal operations.

Note that in this example, the graphical display shown is in a data view mode, here displaying three different graphs, where the middle graph itself includes three signal plots. This mode may be used primarily during execution of the signal analysis function, specifically, to display resultant signals and/or data from one or more of the function block operations.

As FIG. 1A shows, in this example, the signal analysis operations are: a Create Signal operation that specifies and outputs a signal Vin; an NI-FGEN Arbitrary Function Generator operation that receives the Vin signal specification and provides a signal in accordance with the specified waveform as output to a unit under test (UUT) (e.g., a stimulus signal); an NI-HSDIO (high-speed digital I/O) Generate operation that provides a clock signal to the UUT, e.g., for sample timing; an NI-HSDIO Acquire operation that receives a response signal from the UUT (in this particular case, a digital or binary signal); a Convert Digital to Analog operation that converts the received response to a digital "analog" signal, i.e., performs a numeric conversion, e.g., from a binary representation to a real number representation, e.g., with real values ranging from −5.0 to +5.0; and a Distortion operation, which operates to compute distortion for the converted signal, i.e., to calculate a power spectrum analysis of the signal.

Note that in this example, the Arbitrary Function Generator, HSDIO Generate, HSDIO Acquire, and Convert Digital to Analog operations are all associated with actual hardware, where each generally includes a driver software component that communicates with the respective hardware. For example, the Arbitrary Function Generator operation utilizes or invokes a physical arbitrary function generator, the HSDIO Generate operation invokes a clock device or component, the HSDIO Acquire operation uses a DAQ device, and the Convert Digital to Analog operation uses a converter device. Of course, in this example, the UUT is itself also a hardware device. Thus, the signal analysis function of prior art FIG. 1A uses hardware devices to perform the specified signal analysis operations.

Turning now to FIG. 1B, the prior art signal analysis development environment is shown configured to perform an equivalent signal analysis function using a simulation in lieu of the hardware UUT of FIG. 1A. As FIG. 1B shows, the signal analysis function is significantly different from that of FIG. 1A. In fact, an entirely different "project" is required, i.e., the specified functionality must be re-implemented specifically to utilize the simulation. As shown, the same Create Signal and Distortion operations are used, but the hardware-related operations are all replaced with an ADI Simulate A/D Converter operation that replaces the functionality of these operations and associated devices. The fact that an entirely new function must be developed and maintained for the simulation use case (in addition to the function developed for use with hardware) imposes a substantial burden on developers.

Thus, prior art analysis tools, e.g., "benchtops" suffer from major bottlenecks in electronic design verification due to historical functional separation or distinctions between design and test functionality and use. For example, device designers and developers may wish to evaluate components for possible inclusion in a device without having to actually acquire a sample component, but may also need to test or verify actual hardware devices.

Thus, improved systems and methods for specifying and performing signal analysis functions are desired.

SUMMARY OF THE INVENTION

Various embodiments of a system and method for specifying and creating a measurement program for performing a measurement function, e.g., a signal analysis function, are presented. The measurement program is preferably developed and executed in a development environment executing on a computer system, such as, for example, embodiments of the LabVIEW graphical program development environment, or of the Signal Express™ development environment, both provided by National Instruments Corporation.

First, a program, e.g., a measurement program for performing a measurement function may be created in a development environment in response to first user input, e.g., to a graphical user interface (GUI) of the development environment displayed on a display of a computer system. The measurement program may include a plurality of icons that visually indicate the measurement function performed by the measurement program, and may be executable to receive signals from a physical unit under test (UUT), i.e., a hardware device coupled to the computer system. It should be noted that in various embodiments, the plurality of icons that visually indicate the measurement function performed by the measurement program may be nodes in a graphical program, e.g., a LabVIEW graphical program, and/or may be function blocks in an analysis or test sequence, such as in a Signal Express application.

For example, in one embodiment, the development environment may be a graphical data flow program development environment, such as the LabVIEW development environment, provided by National Instruments Corporation. The measurement program may include a plurality of interconnected icons forming a data flow diagram, where connections between the icons indicate that data produced by one icon is used by another icon.

In some embodiments, each of the icons may represent a respective portion or operation of the measurement function.

The plurality of icons may be arranged to visually indicate an order of the respective portions of the measurement function, e.g., an execution order of the operations included in the measurement function. For example, the icons may be function blocks arranged vertically, where execution of the function proceeds from top to bottom, although other arrangements are also contemplated, e.g., horizontal with execution occurring left to right, and so forth.

In some embodiments, creating the measurement program includes configuring the physical UUT with one or more parameter values, such as, for example, sample rate, precision, format, and data value range, among others. Said another way, creating the measurement program may include configuring at least one measurement device with one or more parameter values Then, second user input may be received specifying that the measurement program is to receive simulated data. In other words, the second user input may specify that during execution, instead of the measurement program receiving signals from the physical UUT, the program is to receive simulated data.

The development environment may be configured to provide the simulated data to the measurement program in response to the second user input, where the configuring does not change the measurement program. In other words, the configuring operates to configure or modify the development environment instead of the measurement program. Thus, in one embodiment, configuring the development environment to provide the simulated data to the measurement program includes redirecting input to the measurement program from the physical UUT to a source of the simulated data.

For example, in one embodiment, the development environment may include a driver, e.g., a hardware driver program, for interfacing to the physical UUT. During execution, the measurement program may make calls to the driver to read, write, or otherwise interact with the physical UUT. Configuring the development environment to provide the simulated data to the measurement program may include configuring the driver to provide the simulated data to the measurement program instead of data from the physical UUT. Note that the driver is considered part of the development environment rather than part of the measurement program, and thus, such redirection may be configured without making any changes to the measurement program. For example, the reconfiguration may be performed via calls to the driver, e.g., the development or test environment may make calls to the driver in response to user input.

Note that the source of the simulated data may be any type of source that provides such simulated data. For example, in one embodiment, configuring the development environment to provide the simulated data may include receiving user input specifying a file from a memory, where the file contains the simulated data. Moreover, configuring the development environment to provide the simulated data may include configuring the simulated data in accordance with the one or more parameter values. For example, where the simulated data is provided from a file, the file may also include information specifying how the data were generated, e.g., including sample rate or time-basis for the data, format, and so forth. This information may be compared to the specified parameters for the physical UUT to determine if the simulated data are in accordance with the specified parameters, and if not, appropriate action may be taken. For example, the user may be notified as to the incompatibility of the data, e.g., via a warning or error condition.

Thus, in embodiments where creating the measurement program includes configuring at least one measurement device with one or more parameter values, and where configuring the development environment to provide the simulated data includes receiving user input selecting a file from a memory, configuring the measurement program to receive the simulated data may include examining the file to determine if the simulated data were generated in accordance with the one or more parameter values, and, if the simulated data was not generated in accordance with the one or more parameter values, indicating that the simulated data was not generated in accordance with the one or more parameter values.

Additionally, or alternatively, if the simulated data are determined to not be in accordance with the specified parameters of the physical UUT, the data may be modified to bring it into accord with the specified parameters. As one example, in the case where the sample rate of the data is different from that of the physical UUT, the data may be retrieved from the file and re-sampled, e.g., interpolated, to match the sample rate or time-basis of the physical UUT. As another example, where the units of measurement for the data are not the same as for the physical UUT, unit conversion may be performed on the simulated data. Note that in various embodiments, this modification of the data may occur at configuration time, and/or at execution or run time of the measurement program, and may include any type of modification needed to make the simulated data compatible with the specified parameters of the physical UUT.

In another embodiment, configuring the development environment to provide the simulated data may include configuring a simulator to generate the simulated data, such as a simulator that simulates or emulates the physical UUT (or some other device). Similar to above, the simulator may be configured to generate the simulated data in accordance with the specified parameters of the physical UUT. For example, in one embodiment, parameters governing operation or behavior of the simulator may be modified such that the simulated data are generated in accordance with the physical UUT's parameters. Additionally, or alternatively, the simulator may be configured to modify the data after being generated initially, similar to the modification of simulated data from a file described above. Note that as used herein, the terms "simulation" and "simulation UUT" may be used to refer to simulated data or to a simulator that produces simulated data.

After the above configuring, the measurement program may be executed, where during execution the measurement program may receive the simulated data and perform the measurement function on the simulated data. Note that the measurement function may be any type of function desired, including, for example, displaying, analyzing, transforming or otherwise operating on the data, and/or providing the data to another device, among others.

Thus, the development environment may allow a user to interactively specify whether the measurement program will receive actual data from a physical UUT, or whether the measurement program will receive simulated data instead, e.g., from a file or simulator. Note that in preferred embodiments, the user may change the configuration of the development environment multiple times, switching input for the measurement program back and forth between the physical UUT and the simulated data.

For example, in one embodiment, prior to configuring the development environment to receive simulated data, the measurement program may be executed to measure the physical UUT, including the measurement program receiving signals from the physical UUT. In other words, the measurement program may be executed according to the initial configuration where the development environment is configured to provide signals from the physical UUT to the measurement program. Thus, receiving the second user input specifying that the measurement program is to receive simulated data may be performed after executing the measurement program to measure the physical UUT. In one embodiment, in response to the user input specifying that the measurement program is to receive simulated data, execution of the measurement program may be paused or stop, and the physical UUT disabled.

Similarly, in one embodiment, third user input may be received specifying that the measurement program is to receive signals from the physical UUT, i.e., after the above configuration redirecting the measurement program input from the physical UUT to the simulated data, and in response, the development environment may be configured to provide the signals from the physical UUT to the measurement program, where configuring the development environment to provide the signals from the physical UUT to the measurement program does not change the measurement program. The measurement program may then be executed to provide the signals from the physical UUT to the measurement program, where during execution the measurement program receives the signals from the physical UUT and performs the measurement function on the signals from the physical UUT. For example, in embodiments where the development environment includes a driver for interfacing with the physical UUT, in response to the third input, the driver may be configured to provide the signals from the physical UUT to the measurement program instead of the simulated data. In one embodiment, the third user input may be received during execution of the measurement program using the simulated data.

In some embodiments, the development environment may be operable to execute the measurement program in a continuous execution mode. For example, creating the measurement program may include receiving user input specifying continuous execution of the measurement program, and receiving user input specifying each of a plurality of operations in the measurement program. The measurement program may continue executing as each operation is specified, where, after each operation is specified, the operation is performed substantially continuously. This type of continuous execution is exemplified in the Signal Express™ product provided by National Instruments Corporation.

Note that because the bypass or switching point occurs at the I/O stage of the hardware, the driver may interact with the simulated data, e.g., the file or simulator, in the same way that it does with the physical UUT. Note that switching out the physical (i.e., hardware) UUT with the simulated data (i.e., in the form of a file or simulator) may be transparent to the drivers, and to the measurement program in general (and also the user). Thus, in preferred embodiments, the physical UUT and simulated data system configurations may exist concurrently, where the development environment is operable to switch between the two without having to modify or replace the measurement program.

Thus, the user may toggle the system between a hardware testing mode and a simulation mode, e.g., the user may initiate further UUT/simulated data switches, i.e., toggling between hardware testing and simulation or virtual testing, as desired. In this manner, the user may easily compare performance of the physical UUT (and the measurement program) with that of the simulated data or simulator (and the measurement program).

It should be noted that while in the method described above, the system is configured to operate with the physical UUT first, then switched to operate with the simulated data, in other embodiments, the simulated data may be tested first, and then the physical UUT. In other words, the particular order of the configuration and testing of the physical UUT and simulated data does not matter, so long as the system is configured properly prior to testing.

Thus, various embodiments of the system and method described herein may facilitate interactive specification and performance of a measurement program by the user, and may allow the measurement program to operate with a physical UUT or simulated data without modification of the measurement program.

BRIEF DESCRIPTION OF THE DRAWINGS

A better understanding of the present invention can be obtained when the following detailed description of the preferred embodiment is considered in conjunction with the following drawings, in which.

Figure 1A:
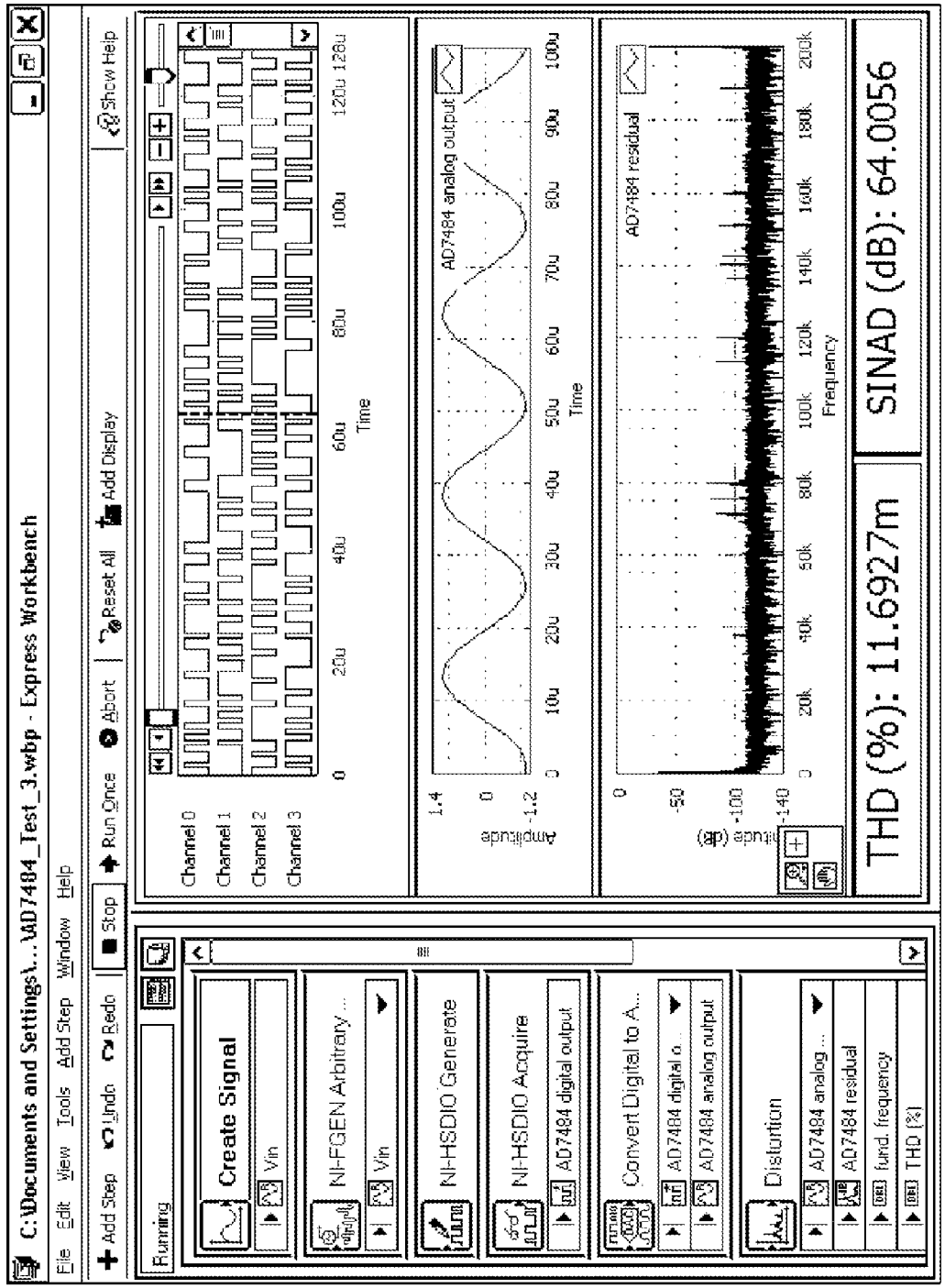
FIG. 1A illustrates a signal analysis system configured for a hardware UUT, according to the prior art.
Figure 1B:
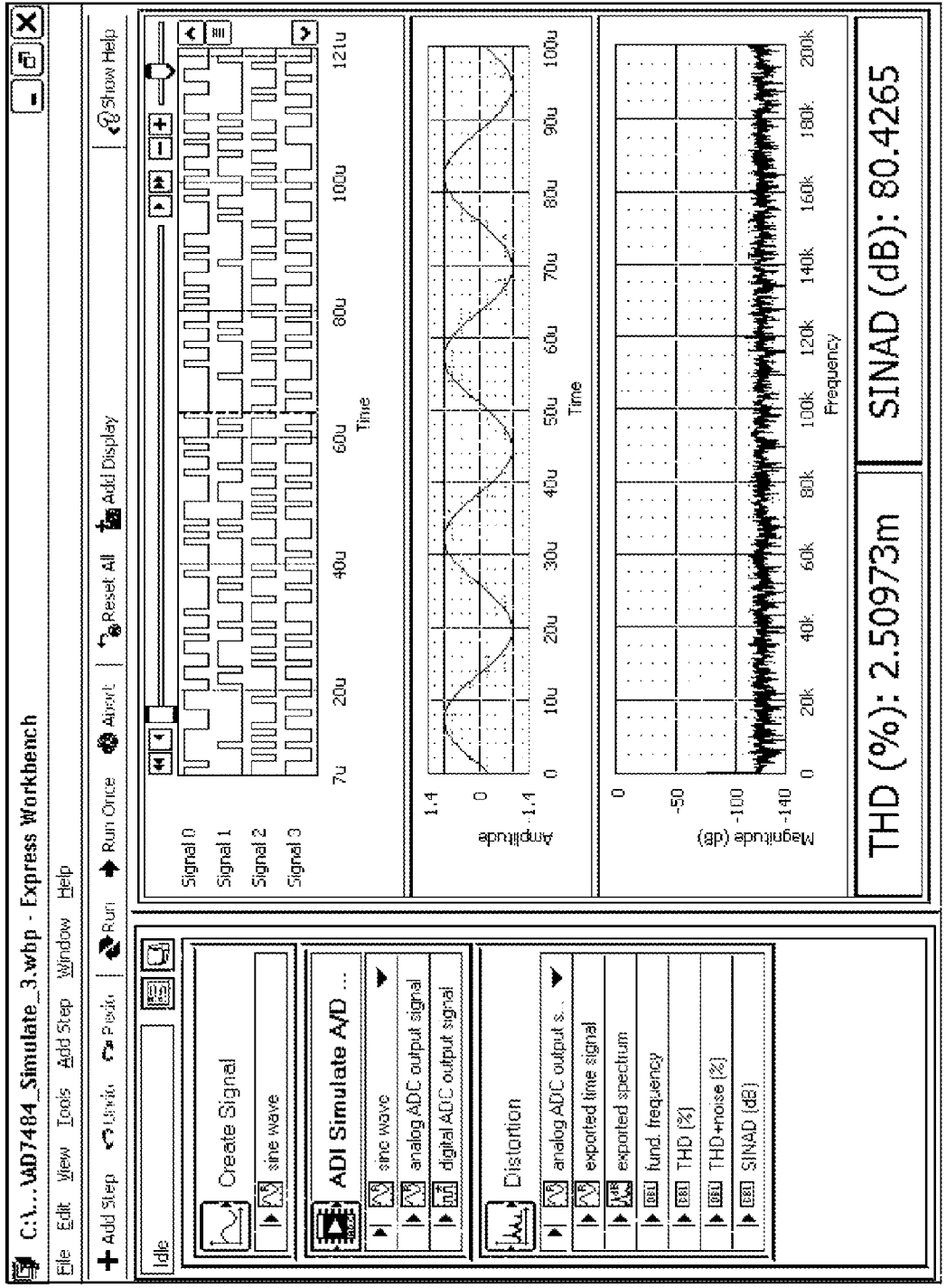
FIG. 1B illustrates a signal analysis system configured for a simulated UUT, according to the prior art.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. application Ser. No. 10/809,107, titled "A Mixed Signal Analysis System and Method of Use", filed Mar. 25, 2004.

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000.

U.S. patent application Ser. No. 09/886,456, titled "System and Method for Programmatically Creating Graphical Program Code in a Graphical Program", filed Jun. 20, 2001.

U.S. patent application Ser. No. 10/809,107, titled, "A Mixed Signal Analysis System and Method of Use", filed Mar. 25, 2004.

U.S. Provisional Application Ser. No. 60/708,560, titled "Virtual Testing In A Mixed Signal Analysis System", filed Aug. 16, 2005.

TERMS

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc. Nodes may be connected together in a graphical program by connection icons or wires.

Data Flow Graphical Program (or Data Flow Diagram)—A graphical program or diagram comprising a plurality of interconnected nodes, wherein the connections between the nodes indicate that data produced by one node is used by another node.

Executive Test Sequence—A sequence of nodes or function blocks specifying respective functions to be performed on a unit under test (UUT), e.g., under a testing or development environment.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response. A measurement device may further be operable to perform modeling or simulation functions, e.g., for use in design or testing procedures.

Simulation—a source of simulated data, such as a file or simulator; also referred to as a simulation unit under test (UUT).

Figure 2A:
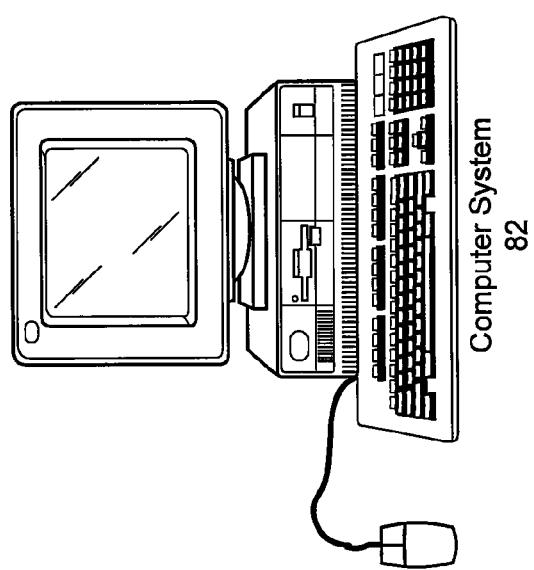
FIG. 2A illustrates a computer system operable to execute a graphical program according to an embodiment of the present invention.

FIG. 2A—Computer System

FIG. 2A illustrates a computer system 82 operable to execute software programs according to various embodiments of the present invention. Various embodiments of a method for specifying and performing a signal analysis function utilizing hardware simulation for virtual testing are described below. It should be noted that as used herein, the term "signal analysis function" refers to any type of function that relates to the generation, acquisition, and/or analysis of signals, e.g., for measurement, testing, control, simulation or modeling, design, prototyping, and so forth.

As shown in FIG. 2A, the computer system 82 may include a display device operable to display signal analysis results as the signal analysis function is created and/or executed. The display device may also be operable to display a graphical user interface during execution of the program. The graphical user interface may comprise any type of graphical user interface, e.g., depending on the computing platform.

The computer system 82 may include a memory medium(s) on which one or more computer programs or software components according to one embodiment of the present invention may be stored. For example, the memory medium may store one or more programs, e.g., graphical programs, which are executable to perform the methods described herein. For example, the memory medium may store one or more software programs implementing a signal analysis function development environment, including hardware simulation, described below in detail, which may facilitate interactive specification, development, and execution of signal analysis functions. More specifically, the signal analysis function development environment may provide an integrated interface for a plurality of instruments for signal analysis, as well as virtual testing using hardware simulation, described below. Also, the memory medium may store a graphical programming environment used to create and/or execute such graphical programs. The memory medium may also store operating system software, as well as other software for operation of the computer system. Various embodiments further include receiving or storing instructions and/or data implemented in accordance with the foregoing description upon a computer accessible storage medium.

Figure 2B:
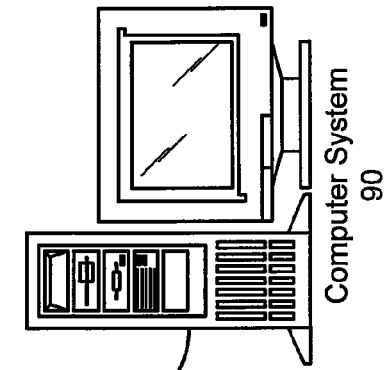
FIG. 2B illustrates a network system comprising two or more computer systems that may implement an embodiment of the present invention.
Figure 2B:
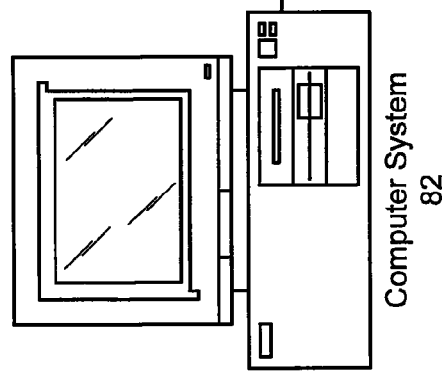

FIG. 2B—Computer Network

FIG. 2B illustrates a system including a first computer system 82 that is coupled to a second computer system 90. The computer system 82 may be connected through a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a program, e.g., a graphical program, in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device 190 connected to the computer system 82. The device 190 may include a programmable hardware element and/or may include a processor and memory medium which may execute a real time operating system. In one embodiment, the graphical program may be downloaded and executed on the device 190. For example, an application development environment with which the graphical program is associated may provide support for downloading a graphical program for execution on the device in a real time system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where embodiments of the present invention may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc. In other words, various embodiments of the present invention are contemplated for use in any field of application where signals are analyzed.

Figure 3A:
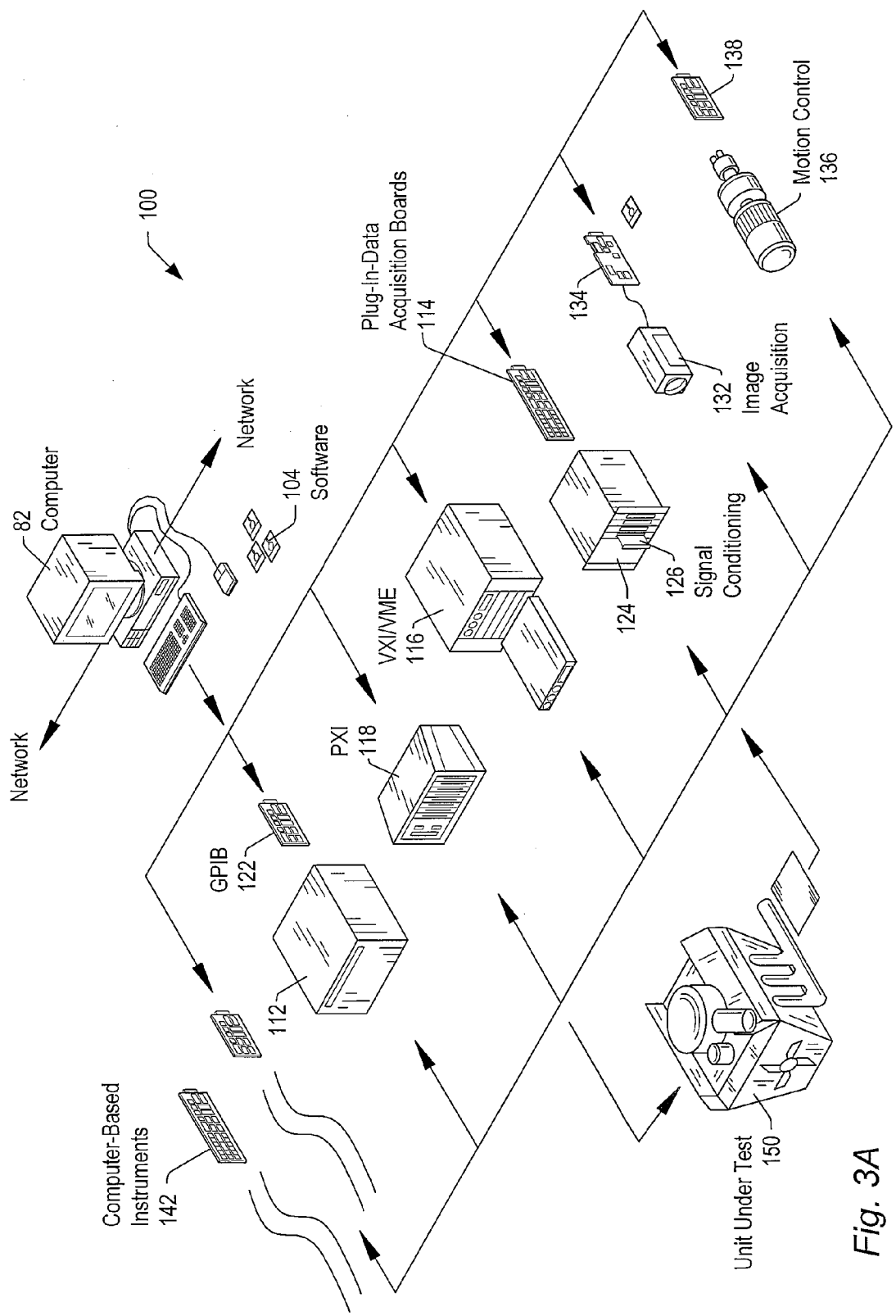
FIG. 3A illustrates an instrumentation control system according to one embodiment of the invention.

FIG. 3A illustrates an exemplary instrumentation control system 100 which may implement embodiments of the invention. The system 100 comprises a host computer 82 which connects to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150, both referred to herein as a UUT. As will be described in detail below, in a preferred embodiment, the computer 82 may execute software that utilizes various virtual instruments (VIs), possibly in conjunction with hardware devices (e.g., boards) and/or instruments coupled to the computer, to analyze signals related to an application, device, or phenomenon, including, for example, a hardware simulation, i.e., a software simulation of a hardware device.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to a hardware UUT 150, i.e., a physical device, and/or a simulation of a hardware UUT, or may be coupled to receive field signals, typically generated by transducers. The system 100 may be used in a data acquisition and control application, in a test and measurement application, an image processing or machine vision application, a process control application, a man-machine interface application, a simulation or modeling application, or a hardware-in-the-loop validation application, among others.

Figure 3B:
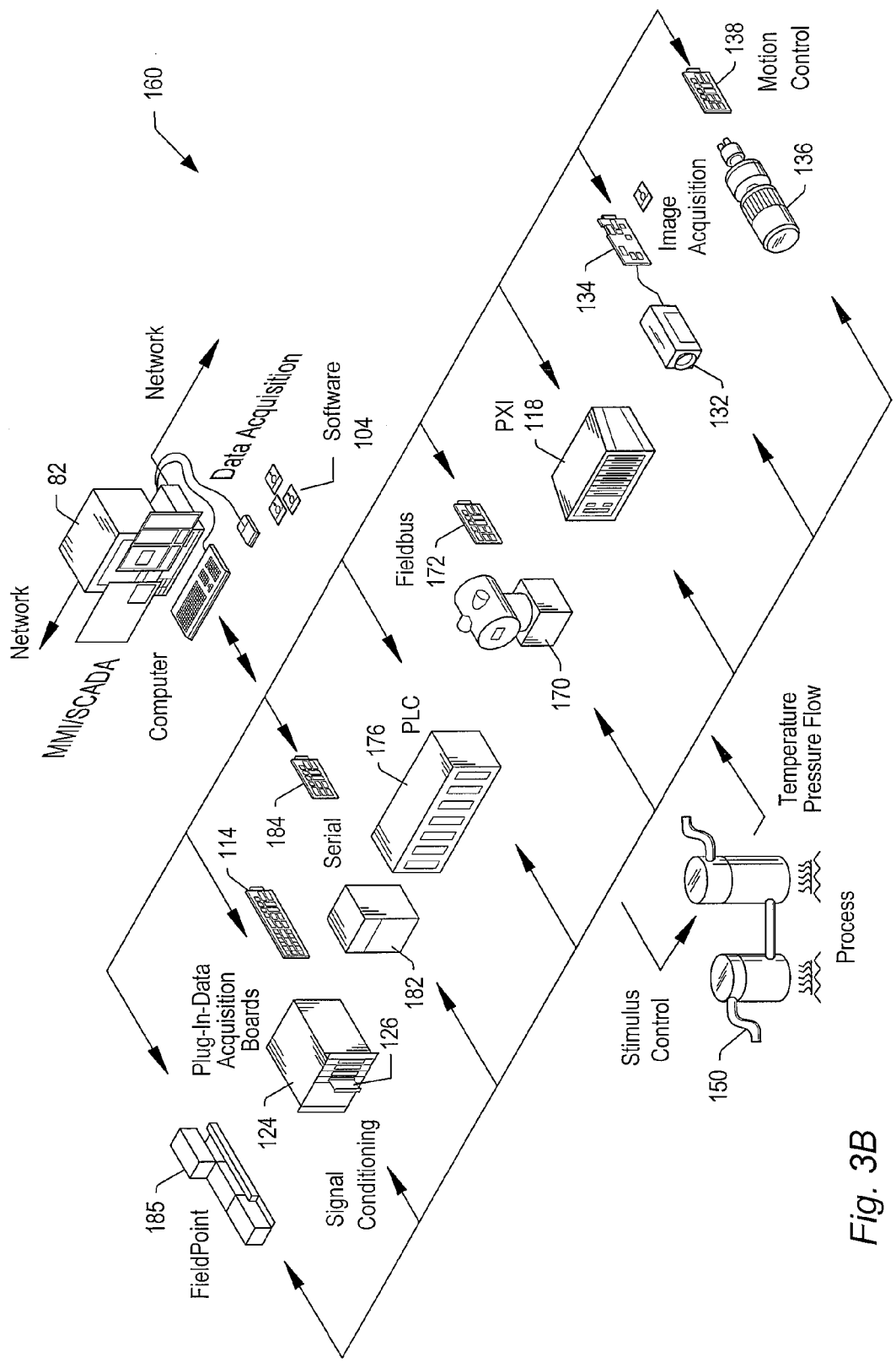
FIG. 3B illustrates an industrial automation system according to one embodiment of the invention.

FIG. 3B illustrates an exemplary industrial automation system 160 that may implement embodiments of the invention. The industrial automation system 160 is similar to the instrumentation or test and measurement system 100 shown in FIG. 3A. Elements which are similar or identical to elements in FIG. 3A have the same reference numerals for convenience. The system 160 may comprise a computer 82 that connects to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

Figure 4A:
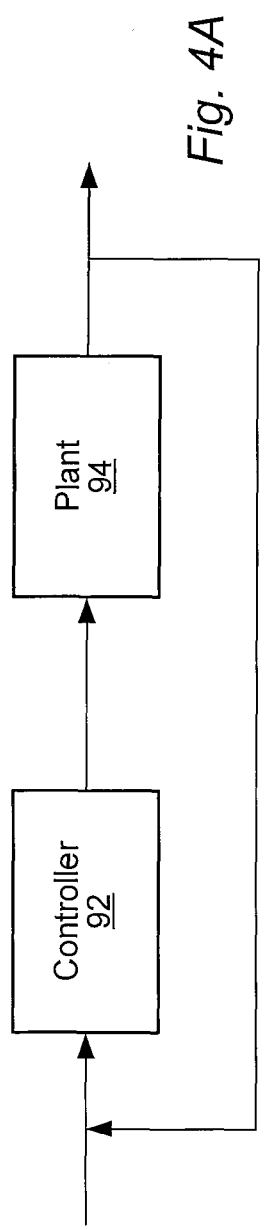
FIG. 4A is a high level block diagram of an exemplary system which may execute or utilize programs according to embodiments of the invention.

FIG. 4A is a high-level block diagram of an exemplary system which may execute or utilize programs, e.g., graphical programs, according to various embodiments of the present invention. FIG. 4A illustrates a general high-level block diagram of a generic control and/or simulation system that comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92. The user may then specify and/or execute a signal analysis function to perform various tests and measurements (analyses) on the model or simulation, the controller 92, and/or the plant 94, e.g., via one or more software programs implementing various embodiments of the present invention, e.g., via a signal analysis function development environment, described below in detail, which may facilitate interactive specification, development, and execution of signal analysis functions.

Figure 4B:
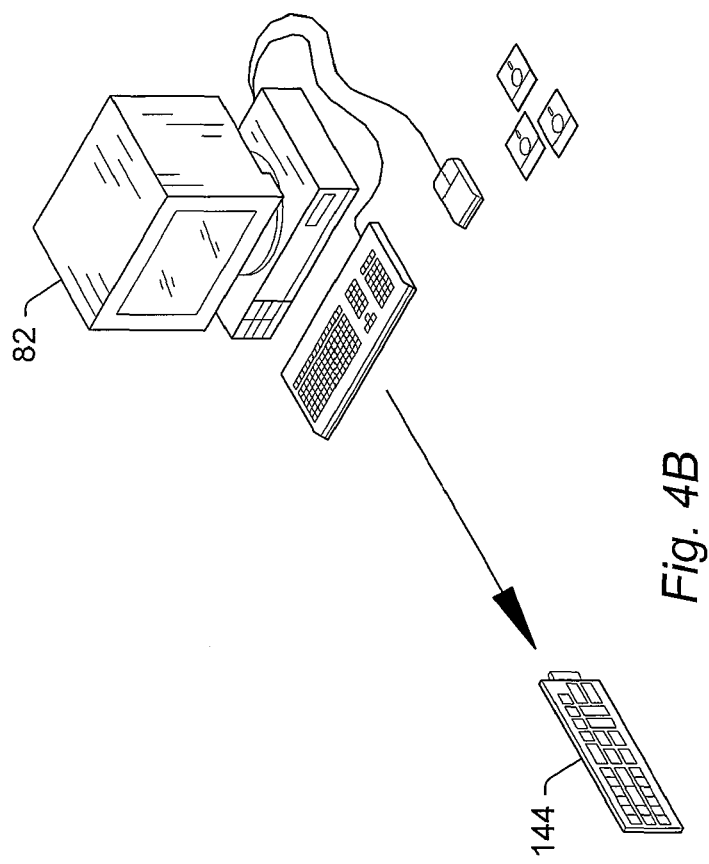
FIG. 4B illustrates an exemplary system that may perform control and/or simulation functions.

FIG. 4B illustrates an exemplary system which may perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 3A, 3B, and 4B above, one or more of the various devices may couple to each other over a network, such as the Internet. In one embodiment, the user operates to select a target device from a plurality of possible target devices for programming or configuration using a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 3A and 3B, may also be referred to as virtual instruments, although as described above, in many cases the software programs may operate in conjunction with hardware, such as DAQ boards or other specialized hardware boards. For example, in one embodiment, one or more of the virtual instruments included in the system may include respective hardware boards that provide hardware based functionality for the virtual instrument. In various embodiments, the boards may be one or both of: a PC expansion board installed in the host computer system, e.g., a PCI card or other type of card; and a card, module, or cartridge that is operable to be inserted into a chassis coupled to the host computer, such as a PXI or GPIB chassis. Of course, any other types of chassis and boards may be used as desired. Such virtual instruments may be used in various embodiments of the present invention to perform signal analysis functions, as described below.

Figure 5:
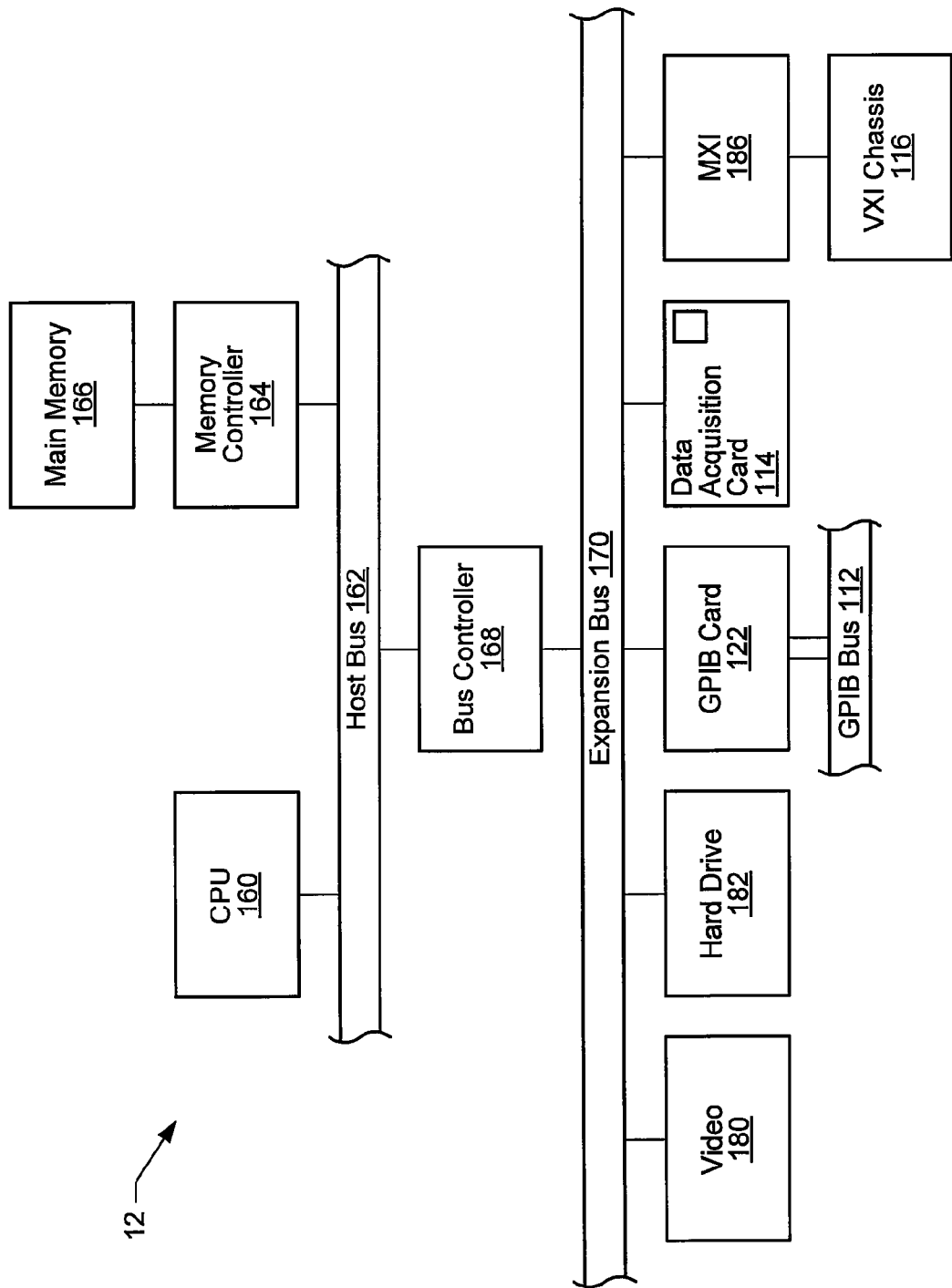
FIG. 5 is an exemplary block diagram of the computer systems of FIGS. 2A, 2B, 3A and 3B and 4B.

FIG. 5—Computer System Block Diagram

FIG. 5 is a block diagram representing one embodiment of the computer system 82 and/or 90 illustrated in FIGS. 2A and 2B, or computer system 82 shown in FIG. 3A or 3B. It is noted that any type of computer system configuration or architecture can be used as desired, and FIG. 5 illustrates a representative PC embodiment. It is also noted that the computer system may be a general-purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store one or more software programs implementing various embodiments of the present invention. For example, the main memory 166 may store a signal analysis function development environment, described below in detail, which may facilitate interactive specification, development, and execution of signal analysis functions. More specifically, the signal analysis function development environment may provide an integrated interface for a plurality of instruments for signal analysis, described below. The main memory 166 may also store one or more hardware simulation programs that are executable to simulate a hardware UUT (i.e., a physical device), which may be configured to provide signals for analysis by the signal analysis operations, e.g., in place of the actual hardware. In other embodiments, one or more of the hardware simulation programs may be resident on other devices coupled to the computer system 82, e.g., computer system 90, or another computer system coupled to the computer system 82 over a network. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170.

As shown, a device 190 may also be connected to the computer. The device 190 may include a processor and memory that may execute a real time operating system. The device 190 may also or instead comprise a programmable hardware element. The computer system may be operable to deploy a graphical program to the device 190 for execution of the graphical program on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Figure 6:
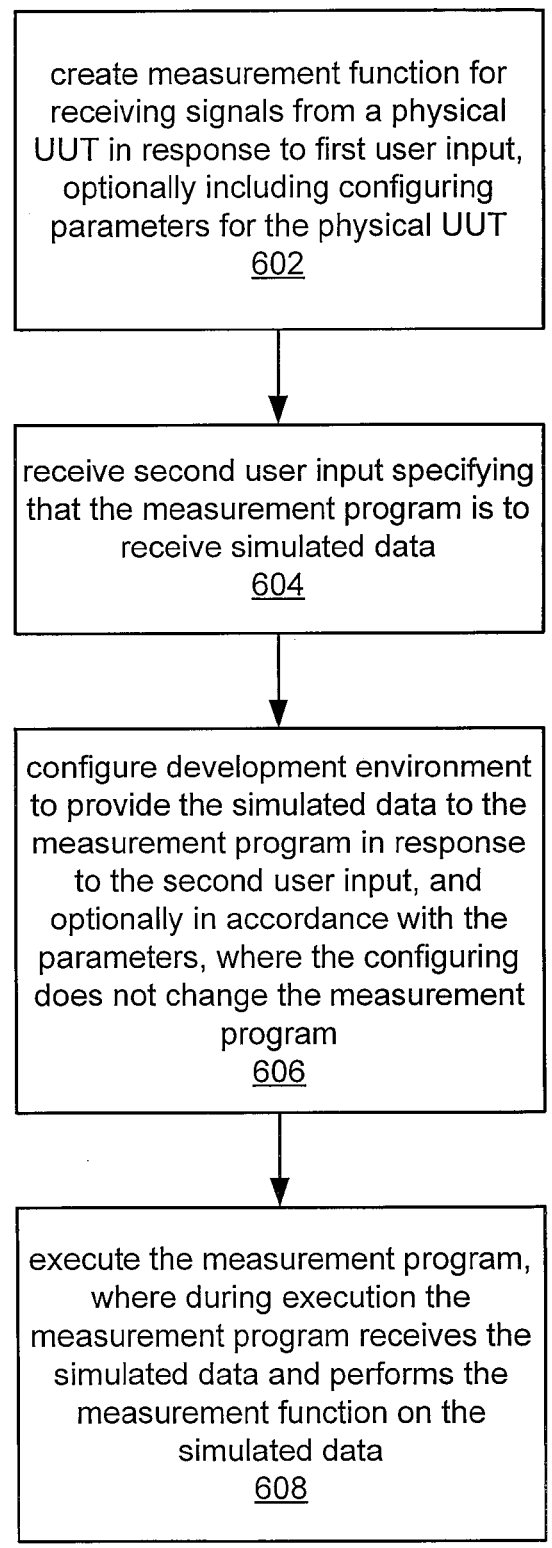
FIG. 6 is a flowchart diagram illustrating one embodiment of a method for specifying and executing a measurement program for performing a measurement function.

FIG. 6—Method for Performing a Measurement Function

FIG. 6 is a high level flowchart of a method for performing a measurement function with respect to a UUT, where the UUT may be a hardware device, or a simulation of a hardware device. The method shown in FIG. 6 may be used in conjunction with any of the computer systems or devices shown in the above Figures, among other devices, as well as simulated devices. It should be noted that in various embodiments, some of the method elements shown may be performed concurrently, in a different order than shown, or may be omitted. Additional method elements may also be performed as desired. As shown, this method may operate as follows.

First, in 602, a measurement program for performing a measurement function may be created in a development environment in response to first user input, e.g., to a graphical user interface (GUI) of the development environment displayed on a display of a computer system. The measurement program may include a plurality of icons that visually indicate the measurement function performed by the measurement program, and may be executable to receive signals from a physical unit under test (UUT), i.e., a hardware device coupled to the computer system. It should be noted that in various embodiments, the plurality of icons that visually indicate the measurement function performed by the measurement program may be nodes in a graphical program, e.g., a LabVIEW graphical program, and/or may be function blocks in an analysis or test sequence, such as in a Signal Express application.

For example, in one embodiment, the development environment may be a graphical data flow program development environment, such as the LabVIEW development environment, provided by National Instruments Corporation. The measurement program may include a plurality of interconnected icons forming a data flow diagram, where connections between the icons indicate that data produced by one icon is used by another icon.

In some embodiments, each of the icons may represent a respective portion or operation of the measurement function. The plurality of icons may be arranged to visually indicate an order of the respective portions of the measurement function, e.g., an execution order of the operations included in the measurement function. For example, the icons may be function blocks arranged vertically, where execution of the function proceeds from top to bottom, although other arrangements are also contemplated, e.g., horizontal with execution occurring left to right, and so forth.

In some embodiments, creating the measurement program includes configuring the physical UUT with one or more parameter values, such as, for example, sample rate, precision, format, and data value range, among others. Said another way, creating the measurement program may include configuring at least one measurement device with one or more parameter values In 604, second user input may be received specifying that the measurement program is to receive simulated data. In other words, the second user input may specify that during execution, instead of the measurement program receiving signals from the physical UUT, the program is to receive simulated data.

In 606, the development environment may be configured to provide the simulated data to the measurement program in response to the second user input, where the configuring does not change the measurement program. In other words, the configuring operates to configure or modify the development environment instead of the measurement program. Thus, in one embodiment, configuring the development environment to provide the simulated data to the measurement program includes redirecting input to the measurement program from the physical UUT to a source of the simulated data.

For example, in one embodiment, the development environment may include a driver, e.g., a hardware driver program, for interfacing to the physical UUT. During execution, the measurement program may make calls to the driver to read, write, or otherwise interact with the physical UUT. Configuring the development environment to provide the simulated data to the measurement program may include configuring the driver to provide the simulated data to the measurement program instead of data from the physical UUT. Note that the driver is considered part of the development environment rather than part of the measurement program, and thus, such redirection may be configured without making any changes to the measurement program. For example, the reconfiguration may be performed via calls to the driver, e.g., the development or test environment may make calls to the driver in response to user input.

Note that the source of the simulated data may be any type of source that provides such simulated data. For example, in one embodiment, configuring the development environment to provide the simulated data may include receiving user input specifying a file from a memory, where the file contains the simulated data. Moreover, configuring the development environment to provide the simulated data may include configuring the simulated data in accordance with the one or more parameter values. For example, where the simulated data is provided from a file, the file may also include information specifying how the data were generated, e.g., including sample rate or time-basis for the data, format, and so forth. This information may be compared to the specified parameters for the physical UUT to determine if the simulated data are in accordance with the specified parameters, and if not, appropriate action may be taken. For example, the user may be notified as to the incompatibility of the data, e.g., via a warning or error condition.

Thus, in embodiments where creating the measurement program includes configuring at least one measurement device with one or more parameter values, and where configuring the development environment to provide the simulated data includes receiving user input selecting a file from a memory, configuring the measurement program to receive the simulated data may include examining the file to determine if the simulated data were generated in accordance with the one or more parameter values, and, if the simulated data was not generated in accordance with the one or more parameter values, indicating that the simulated data was not generated in accordance with the one or more parameter values.

Additionally, or alternatively, if the simulated data are determined to not be in accordance with the specified parameters of the physical UUT, the data may be modified to bring it into accord with the specified parameters. As one example, in the case where the sample rate of the data is different from that of the physical UUT, the data may be retrieved from the file and re-sampled, e.g., interpolated, to match the sample rate or time-basis of the physical UUT. As another example, where the units of measurement for the data are not the same as for the physical UUT, unit conversion may be performed on the simulated data. Note that in various embodiments, this modification of the data may occur at configuration time, and/or at execution or run time of the measurement program, and may include any type of modification needed to make the simulated data compatible with the specified parameters of the physical UUT.

In another embodiment, configuring the development environment to provide the simulated data may include configuring a simulator to generate the simulated data, such as a simulator that simulates or emulates the physical UUT (or some other device). Similar to above, the simulator may be configured to generate the simulated data in accordance with the specified parameters of the physical UUT. For example, in one embodiment, parameters governing operation or behavior of the simulator may be modified such that the simulated data are generated in accordance with the physical UUT's parameters. Additionally, or alternatively, the simulator may be configured to modify the data after being generated initially, similar to the modification of simulated data from a file described above. Note that as used herein, the terms "simulation" and "simulation UUT" may be used to refer to simulated data or to a simulator that produces simulated data.

In 608, the measurement program may be executed after the configuring, where during execution the measurement program may receive the simulated data and perform the measurement function on the simulated data. Note that the measurement function may be any type of function desired, including, for example, displaying, analyzing, transforming or otherwise operating on the data, and/or providing the data to another device, among others.

Thus, the development environment may allow a user to interactively specify whether the measurement program will receive actual data from a physical UUT, or whether the measurement program will receive simulated data instead, e.g., from a file or simulator. Note that in preferred embodiments, the user may change the configuration of the development environment multiple times, switching input for the measurement program back and forth between the physical UUT and the simulated data.

For example, in one embodiment, prior to configuring the development environment to receive simulated data, the measurement program may be executed to measure the physical UUT, including the measurement program receiving signals from the physical UUT. In other words, the measurement program may be executed according to the initial configuration where the development environment is configured to provide signals from the physical UUT to the measurement program. Thus, receiving the second user input specifying that the measurement program is to receive simulated data may be performed after executing the measurement program to measure the physical UUT. In one embodiment, in response to the user input specifying that the measurement program is to receive simulated data, execution of the measurement program may be paused or stop, and the physical UUT disabled.

Similarly, in one embodiment, third user input may be received specifying that the measurement program is to receive signals from the physical UUT, i.e., after the above configuration redirecting the measurement program input from the physical UUT to the simulated data, and in response, the development environment may be configured to provide the signals from the physical UUT to the measurement program, where configuring the development environment to provide the signals from the physical UUT to the measurement program does not change the measurement program. The measurement program may then be executed to provide the signals from the physical UUT to the measurement program, where during execution the measurement program receives the signals from the physical UUT and performs the measurement function on the signals from the physical UUT. For example, in embodiments where the development environment includes a driver for interfacing with the physical UUT, in response to the third input, the driver may be configured to provide the signals from the physical UUT to the measurement program instead of the simulated data. In one embodiment, the third user input may be received during execution of the measurement program using the simulated data.

In some embodiments, the development environment may be operable to execute the measurement program in a continuous execution mode. For example, creating the measurement program may include receiving user input specifying continuous execution of the measurement program, and receiving user input specifying each of a plurality of operations in the measurement program. The measurement program may continue executing as each operation is specified, where, after each operation is specified, the operation is performed substantially continuously. This type of continuous execution is exemplified in the Signal Express™ product provided by National Instruments Corporation. For further information regarding such continuous execution in a development environment, please see co-pending U.S. patent application Ser. No. 10/809,107, titled, "A Mixed Signal Analysis System and Method of Use", filed Mar. 25, 2004, which was incorporated by reference above.

Figure 7:
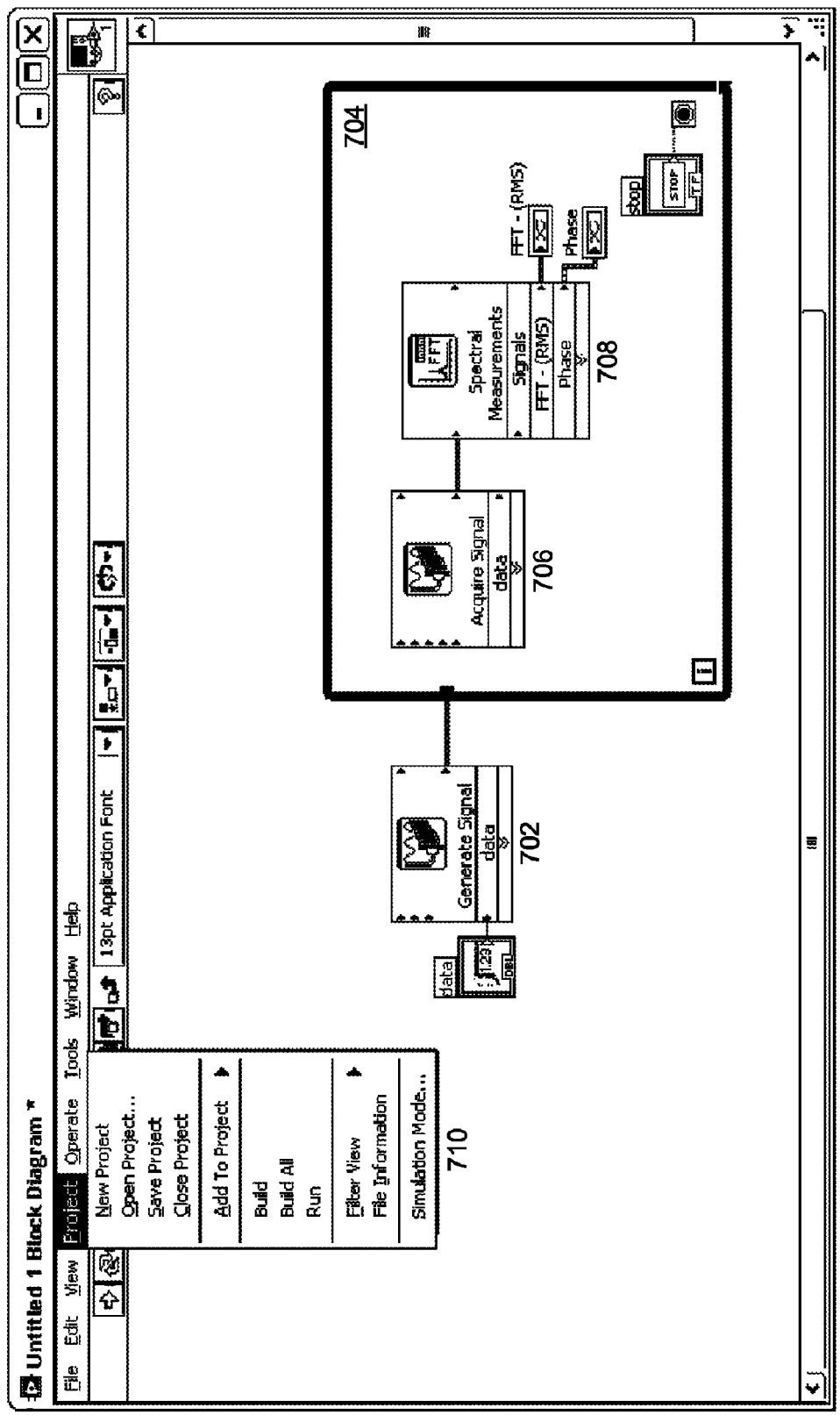
FIG. 7 illustrates an exemplary development environment and graphical program implementing one embodiment of the present invention.

FIG. 7 is a simple exemplary graphical program illustrating one embodiment of the present invention. As may be seen, in this example, a generate signal node 702 is coupled to a loop node 704 (rectangular loop) that contains an acquire signal node 706 coupled to a spectral measurements node 708. The generate signal node 702 operates to produce a signal and provide the signal (data) to the acquire signal node 704, which captures the signal data and provides the data to the spectral measurements node 708, which is a signal analysis node that may be configured to perform any of various operations on the signal data, e.g., a Fast Fourier Transform (FFT), or phase operation, as indicated by the node icon.

As FIG. 7 also shows, a GUI of the development or testing environment may facilitate selection of an execution or target mode for the graphical program, specifically, simulation mode or hardware mode, i.e., where the measurement program is specified to receive simulated data or data from a hardware device (UUT), respectively, as described above. More specifically, in this particular example, a pulldown menu 710 is shown from which the user may configure these modes. As with the method of FIG. 6, in this embodiment, the development environment is shown initially configured to provide the hardware data to the measurement program, and so, as may be seen, the menu displays the selectable "Simulation Mode" as an option. In one embodiment, once in simulation mode, the menu may display "Hardware Mode", or its equivalent, allowing the user to switch back to the configuration specifying that the program receive data from the hardware device. Of course, any other means for specifying the mode of the environment may be used as desired. It should also be noted that in various embodiments, the environment may have a default configuration of either simulation mode or hardware mode, as desired. Additionally, the configuration may be switched back and forth between hardware mode and simulation mode as desired, as described in more detail below.

Note that while in the embodiment of FIG. 7, a pulldown menu is used to configure the development environment (for hardware or simulation mode), any other means may be used as desired. For example, in one embodiment, the user may right click on a node to invoke a menu or dialog whereby the mode may be specified.

In one embodiment, when switching the program to simulation mode, e.g., through pulldown menu 710, the graphical program may be analyzed and all graphical program nodes that communicate with hardware may be automatically reconfigured to communicate with the simulator either by passing signals to the simulation or by retrieving results of the simulation. In some embodiments, when there is ambiguity about how to reconfigure the simulation a connection wizard may be used to allow the user to resolve the ambiguities. After first connection, switching between hardware mode and simulation mode may be accomplished through a menu option, as described above. Note that in the case of this diagram (FIG. 7), both the generation and acquire signal nodes may require (automatic) configuration to communicate with the simulation instead of the physical hardware.

FIGS. 8-10E—Exemplary System and Method for Signal Analysis

FIGS. 8-10E illustrate various aspects of exemplary embodiments of the present invention directed to creation and performance of a signal analysis function in a signal analysis development environment. More specifically, FIG. 8 flowcharts one embodiment of a method for performing signal analysis, FIGS. 9A and 9B respectively illustrate high-level hardware and simulation system setups or configurations suitable for performing the method of FIG. 8, according to one embodiment. Finally, FIGS. 10A-10E illustrate exemplary screenshots providing a "walk-through" of one embodiment of the method of FIG. 8. More specifically, FIGS. 10A-10E illustrate use of an exemplary graphical user interface (GUI) for a signal analysis function development environment, according to various embodiments, whereby a user may interactively specify (and perform) a signal analysis function according to various embodiments of the method of FIG. 8. In other words, an example walk-through is provided to illustrate one example of the process and to illustrate corresponding aspects of the GUI. In these examples, a UUT, specifically an LC-Diode filter circuit or a simulation thereof, is stimulated with a test signal, and the circuit's (or simulation's) response captured and analyzed.

Figure 8:
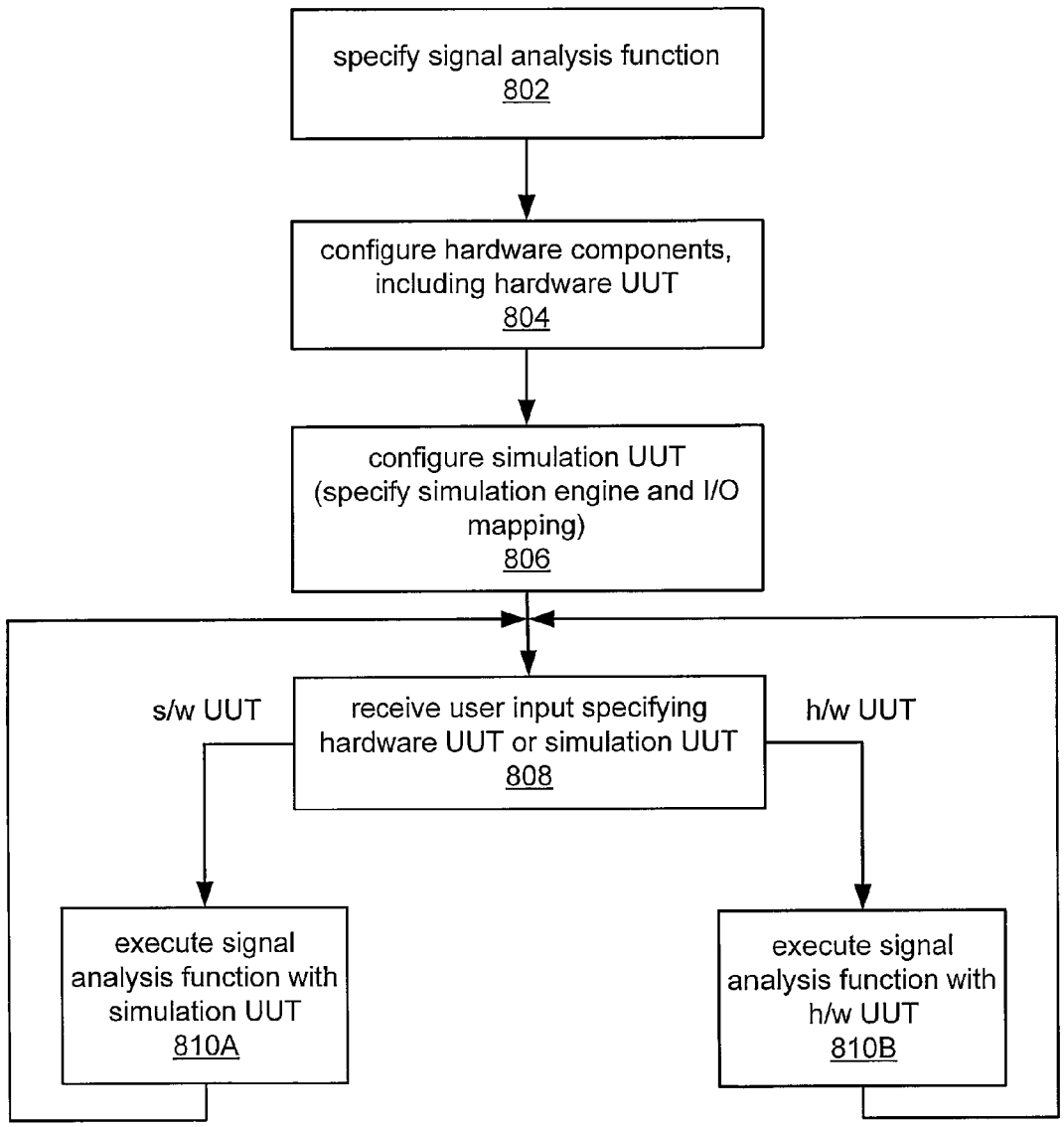
FIG. 8 is a flowchart diagram illustrating one embodiment of a method for specifying and executing a signal analysis function.

FIG. 8—Flowchart of a Method for Signal Analysis

As noted above, FIG. 8 illustrates a method for interactively specifying and performing a signal analysis function with respect to a UUT, where the UUT may be a hardware device, or a simulation of a hardware device, e.g., a file of simulated data or a simulator. The method shown in FIG. 8 may be used in conjunction with any of the computer systems or devices shown in the above Figures, among other devices, as well as simulated devices. It should be noted that in various embodiments, some of the method elements shown may be performed concurrently, in a different order than shown, or may be omitted. Additional method elements may also be performed as desired. As shown, this method may operate as follows.

First, in 802, a signal analysis function may be specified. For example, in a preferred embodiment, user input may be received to a signal analysis development environment specifying a plurality of operations, where each operation implements at least a portion of a signal analysis function. For example, in a preferred embodiment, the user input may be received to a graphical user interface (GUI) of a signal analysis function development environment, which, as noted earlier, may facilitate interactive specification, development, and execution of signal analysis functions. More specifically, the signal analysis function development environment may provide an integrated graphical interface for signal analysis function development and execution. In one embodiment, the signal analysis function may be configured for communicating with a hardware device, e.g., a first device, which may be referred to as a physical or hardware UUT.

As mentioned above, the signal analysis function development environment executes on a computer system that includes a display, i.e., a display device, such as a computer monitor, which operates to display the GUI. The GUI preferably includes a display window or panel for displaying the signal analysis function (e.g., icons/function blocks), signals, and signal analysis results (from the operations).

The user may specify the operation in any of a variety of ways. For example, in one embodiment the user may select (e.g., with a pointing device, such as a mouse) the operations from a menu. For example, a menu of selectable operations may be provided by the signal analysis function development environment, e.g., from a menu bar. In another embodiment the user may select each operation from a palette of function icons, where each function icon represents a respective operation. For example, the user may double click on the icon for the operation, thereby invoking a configuration GUI for the operation through which the user may provide input configuring the operation. As another example, the user may "drag and drop" the icon from the palette onto a diagram, active window, and/or another icon. In one embodiment, each function icon may be associated with or comprised in a respective function block. For further information regarding specification of signal analysis functions in a signal analysis development environment, please see U.S. application Ser. No. 10/809,107, which was incorporated by reference above.

It is noted that other methods of selecting and specifying the operations are also contemplated, such as, for example, the user entering the name of the desired operation into a text entry field, although graphical selection methods are preferred. It should be further noted that the embodiments described herein are meant to be exemplary only, and are not intended to limit the features or operation of the system to any particular set of features, steps, or mechanisms.

In 804, hardware components that are usable by the specified signal analysis function may be configured, e.g., hardware boards, instruments, etc., such as signal generators, DAQ boards, digitizers, and so forth specified for use in the signal analysis function, as well as the physical UUT, may be connected to the host computer/controller, and/or each other, and otherwise configured as required. It should be noted that in some embodiments, the hardware components may be configured (e.g., connected, etc.) prior to specification of the signal analysis function of 802. Configuring the hardware components may also include configuring some aspects of the function and/or environment. For example, one or more of the specified operations/function blocks may be configured to communicate with the hardware components, e.g., the physical UUT, e.g., by specifying I/O channels and so forth.

In some embodiments, if the signal analysis function development environment is in an "Execute Continuously" mode, the specified operations may execute while further operations are specified. In other words, each operation may begin executing as part of the function upon specification/configuration of the operation, where the function continues to execute as operations are added, modified, or removed.

Figure 9A:
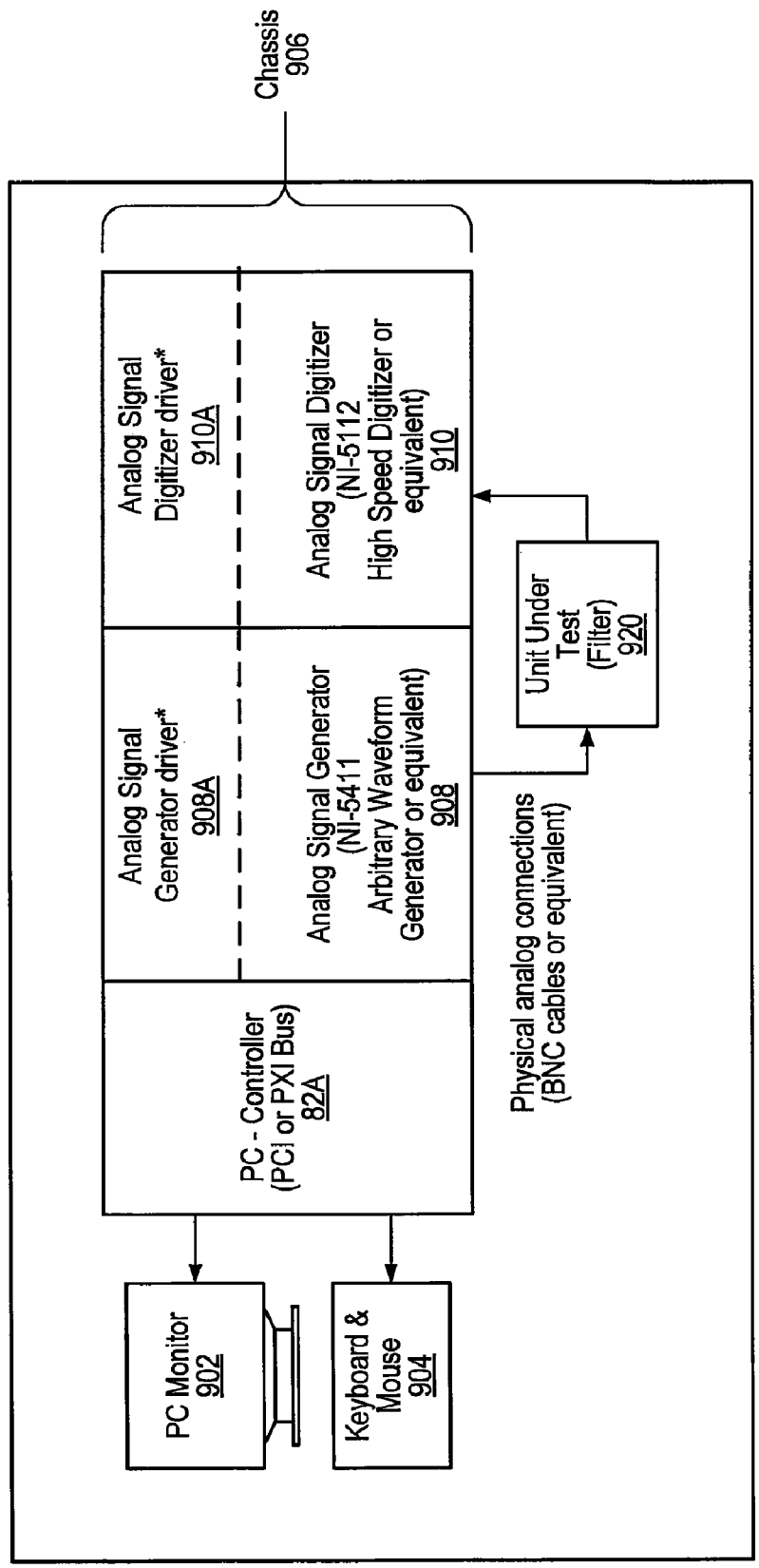
FIGS. 9A and 9B respectively illustrate high-level hardware and simulation system configurations suitable for performing the method of FIG. 8, according to one embodiment.

As mentioned above, FIG. 9A illustrates one embodiment of the system configured for hardware testing, specifically, of UUT 920 (hardware or physical UUT). As FIG. 9A shows, in this particular example, the system includes a computer monitor 902 and keyboard/mouse 904 coupled to a PCI or PXI chassis 906, where the chassis includes a plurality of boards or cards, including a PC-Controller (e.g., a computer on a card, with a bus, e.g., a PCI or PXI bus) 82A, an analog signal generator (e.g., a PXI-4461 device) 908, and a high speed analog signal digitizer, also referred to as a scope (e.g., an NI-5112 High Speed Digitizer) 910. Note that in this embodiment, the PC-Controller 82A functions as the host computer for the system. Thus, in this embodiment, substantially all of the hardware for the system other than human interface devices, i.e., the monitor, keyboard, and mouse, is included in a PCI or PXI chassis, including the host computer itself, where each hardware device may comprise a PXI (or PCI, etc.) card or board.

As FIG. 9A also shows, the analog signal generator 908 and the scope (digitizer) 910 are each coupled to the UUT 920, in this example, the LC-Diode filter circuit mentioned above, via physical connections, e.g., BNC cables or equivalent. As indicated by the directional connections, the analog signal generator 908 may be operable to send signals to the UUT 920, and the scope 910 may be operable to receive signals from the UUT 920. Of course, each of the other hardware devices or boards is preferably communicatively coupled to the PC-Controller or host computer 82A, whereupon various software programs according to the present invention may be executed, e.g., software portions of VIs, the development environment, and so forth.

Note that each of the components 908 and 910 includes a driver (software) portion (908A and 910A, respectively) and a hardware portion, where, as is well known in the art, the driver programs execute on the host computer (e.g., the controller 82A) and communicate with the associated hardware devices.

Figure 10A:
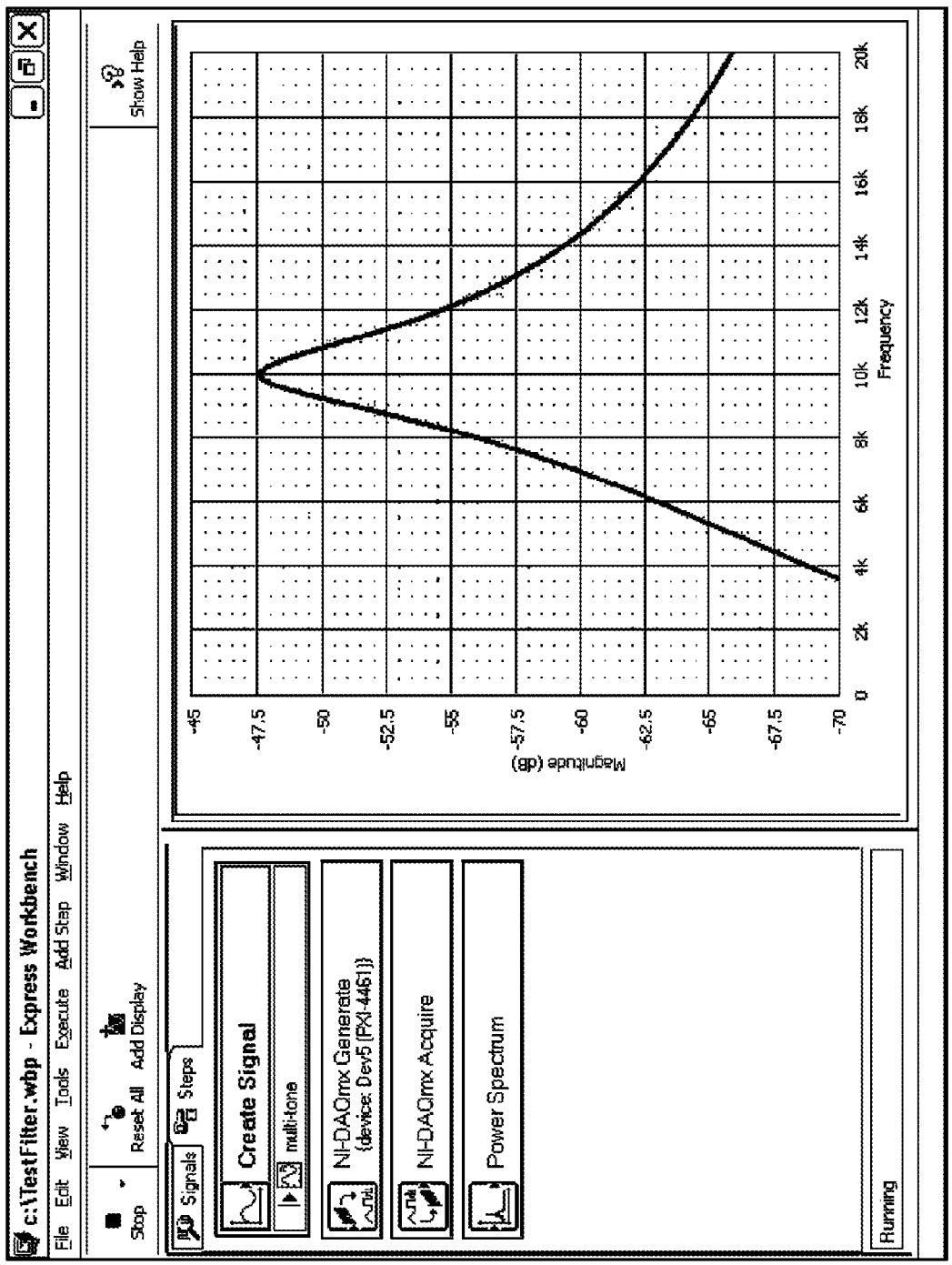
FIGS. 10A-10E illustrate an example walk-through of an exemplary signal analysis function specification and performance using both hardware and simulation, according to one embodiment.
Figure 10B:
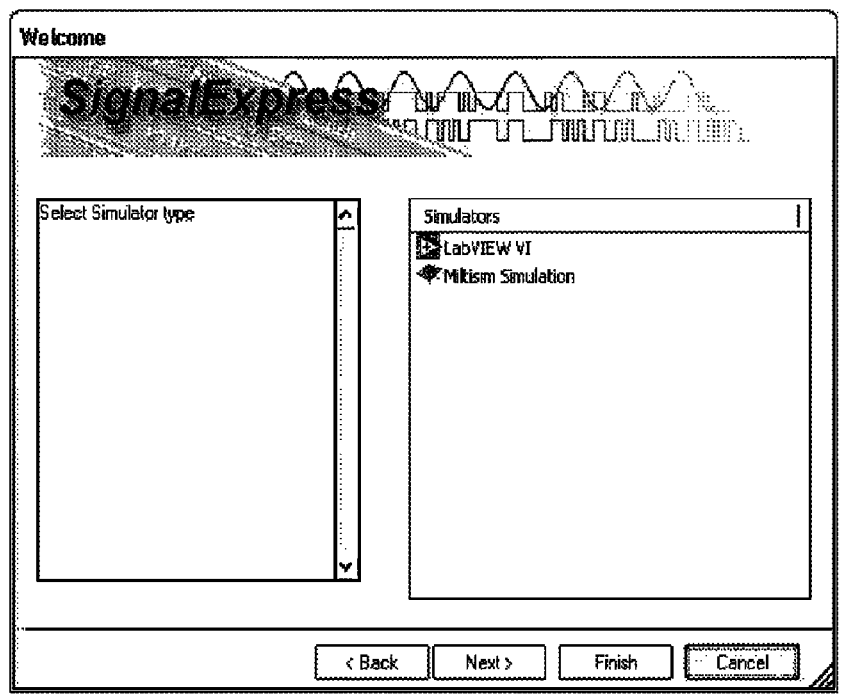

FIG. 10A illustrates one embodiment of the GUI, where an example signal analysis function has been specified, executed (or is executing), and results displayed in a display area of the GUI. In the example shown in FIG. 10A, the function blocks specified and included in the signal analysis function include a Create Signal operation, an NI-DAQmx Generate operation (device type or model PXI-4461), corresponding to the analog signal generator board 908 of FIG. 9A, an (analog) NI-DAQmx Acquire operation corresponding to the analog signal digitizer 910 of FIG. 9A, and a Power Spectrum operation. Note that the Power Spectrum operation is an analysis operation performed by software executing on the Controller 82A. Note that the power spectrum shown in FIG. 10A is for the hardware UUT (Device 5 (PXI-4461)).

In 806, a simulation UUT may be configured, e.g., a simulation of the physical or hardware UUT. In other words, the UUT may be a simulation of a physical device, such as the LC-Diode filter circuit mentioned above. For example, the user may invoke one or more dialogs or other GUI elements operable to receive user input specifying the simulation to be used in or by the signal analysis function. For example, as indicated in FIG. 8B, a dialog may be presented that may receive input from the user specifying the type of simulation to use, e.g., specifying the simulation engine. In this example, the user may select between a LabVIEW VI type simulator and a Multisim simulation, although in other embodiments any other simulation types or engines may be used as desired. Thus, user input may be received to the GUI specifying a simulator type or simulation engine. Note that both LabVIEW and Multisim simulation engines are provided respectively by National Instruments Corporation, and Electronic Workbench, a wholly owned subsidiary thereof.

Figure 10C:
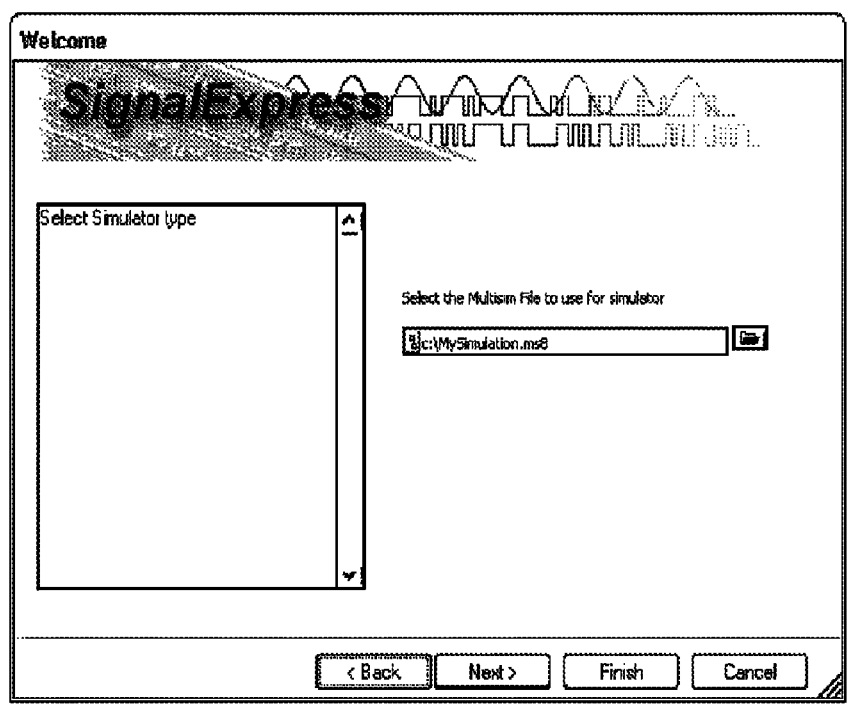

In some embodiments, configuring the simulation may include specifying a simulation file. For example, depending upon the simulation type specified, the user may indicate a particular simulation file in accordance with the specified simulation time. FIG. 10C illustrates specification of a Multisim simulation file via a file browser/data entry field, specifically, "c:\MySimulation.ms8". As shown in FIG. 10C, in some embodiments, only those simulation files consonant with the specified simulation type (e.g., LabVIEW, Multisim, etc.) may be displayed for selection. In one embodiment, specification of the simulation file may invoke a load/configuration process in which the specified simulation engine is configured to execute the specified simulation file.

Figure 11:
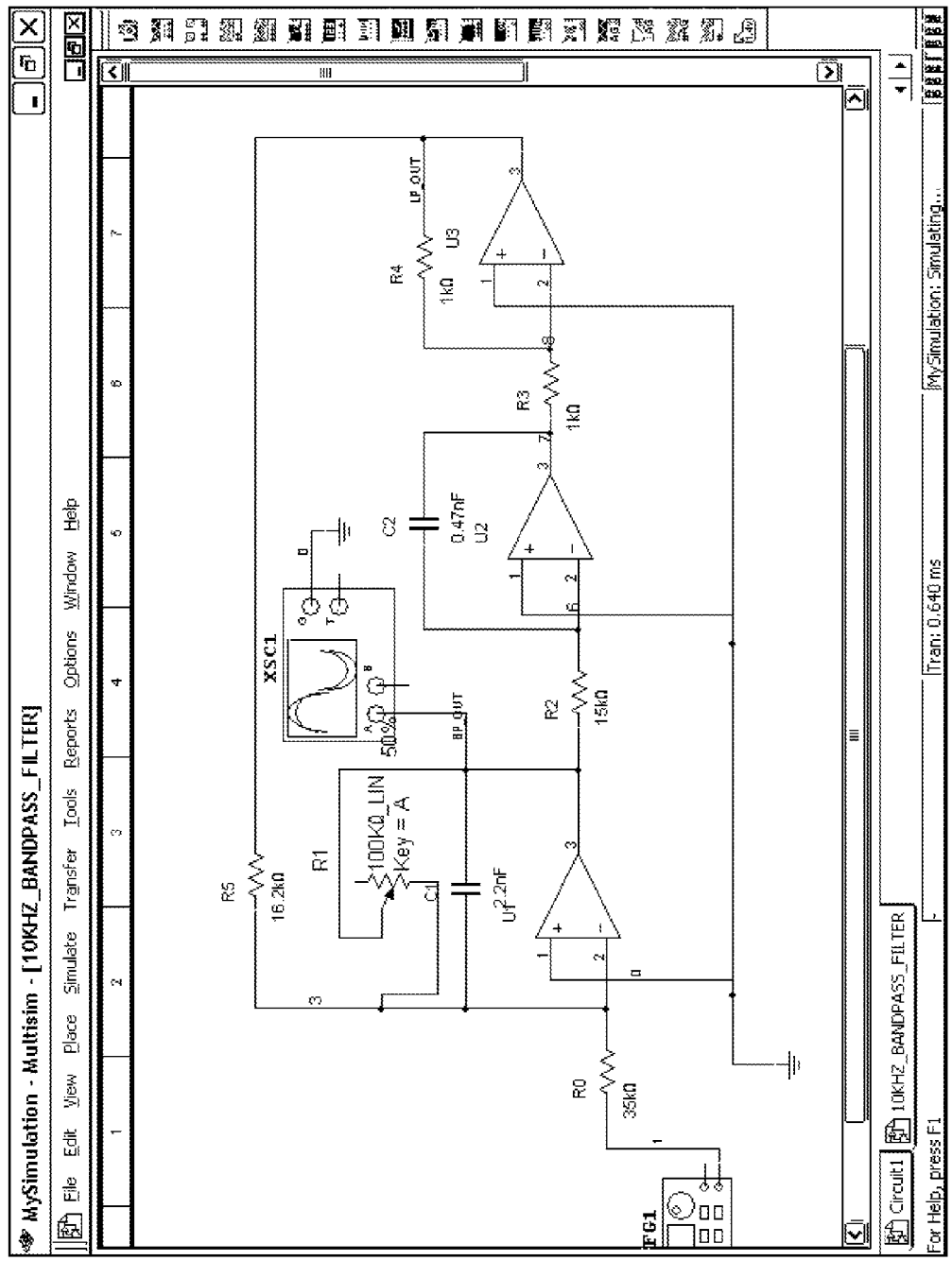
FIG. 11 illustrates an exemplary device simulation program, according to one embodiment.

FIG. 11 illustrates one embodiment of a simulation program, specifically, the "MySimulation" file mentioned above, which is a simulation of a 10 KHz Bandpass Filter (the LC-Diode filter circuit) i.e., a simulation of the hardware UUT of the present example. As shown, the example of FIG. 11 is a Multisim circuit simulation that operates to filter a received input signal and return a filtered signal as output.

Figure 10D:
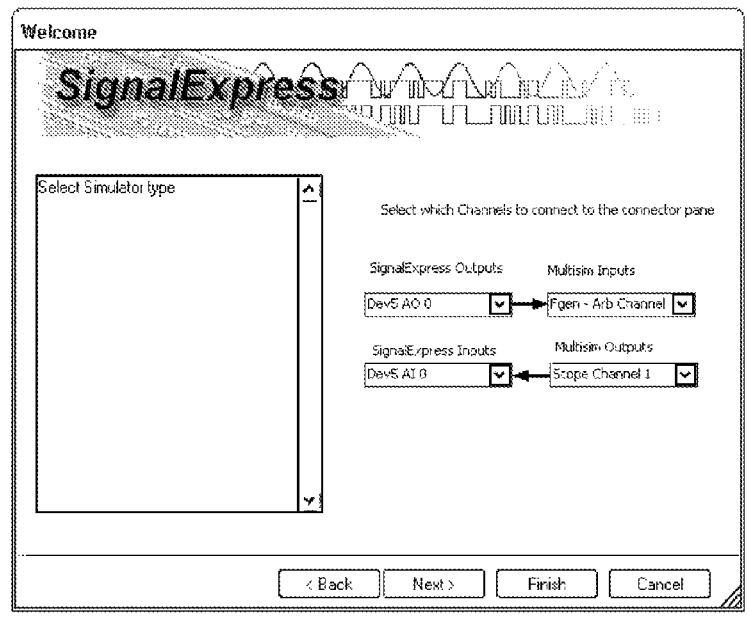

In one embodiment, configuring the simulation may further include specifying I/O mapping for the simulation/hardware. In other words, one or more GUI elements, e.g., dialogs, may be presented to the user, whereby the user may indicate or otherwise specify the I/O relationship between the signal analysis development environment and the simulation. In other words, the user may specify the simulation I/O assignments that correlate with the hardware UUT I/O. For example, as shown in FIG. 10D, the signal analysis development environment's analog output (e.g., normally targeted to the hardware UUT (Device 5)) is mapped to the Multisim simulation's input "Fgen—Arb Channel", while the signal analysis development environment's analog input (e.g., normally received from the hardware UUT) is mapped to the Multisim simulation's output "Scope Channel 1". In some embodiments, there may be multiple input and/or output channels whose mappings may be specified by the user.

In some embodiments, the signal analysis development environment may be operable to provide default mappings for the I/O. In other words, the method may automatically determine these I/O mappings, e.g., based upon table lookups, heuristics, application queries, published interfaces, and so forth. Of course, such default mappings may be overridden by the user as desired.

In some embodiments, prior to, or as part of, configuring the simulation, the hardware components, e.g., the physical UUT 920 and possibly one or more hardware devices, e.g., arbs, DAQ boards, etc., may be disabled. For example, in one embodiment, the user may click on or otherwise activate a "Simulation" button or equivalent, and if the simulation has not yet been configured, the activation may pause or stop the function execution, disable the hardware components, and/or invoke one or more simulation configuration dialogs whereby the simulation may be configured.

Figure 9B:
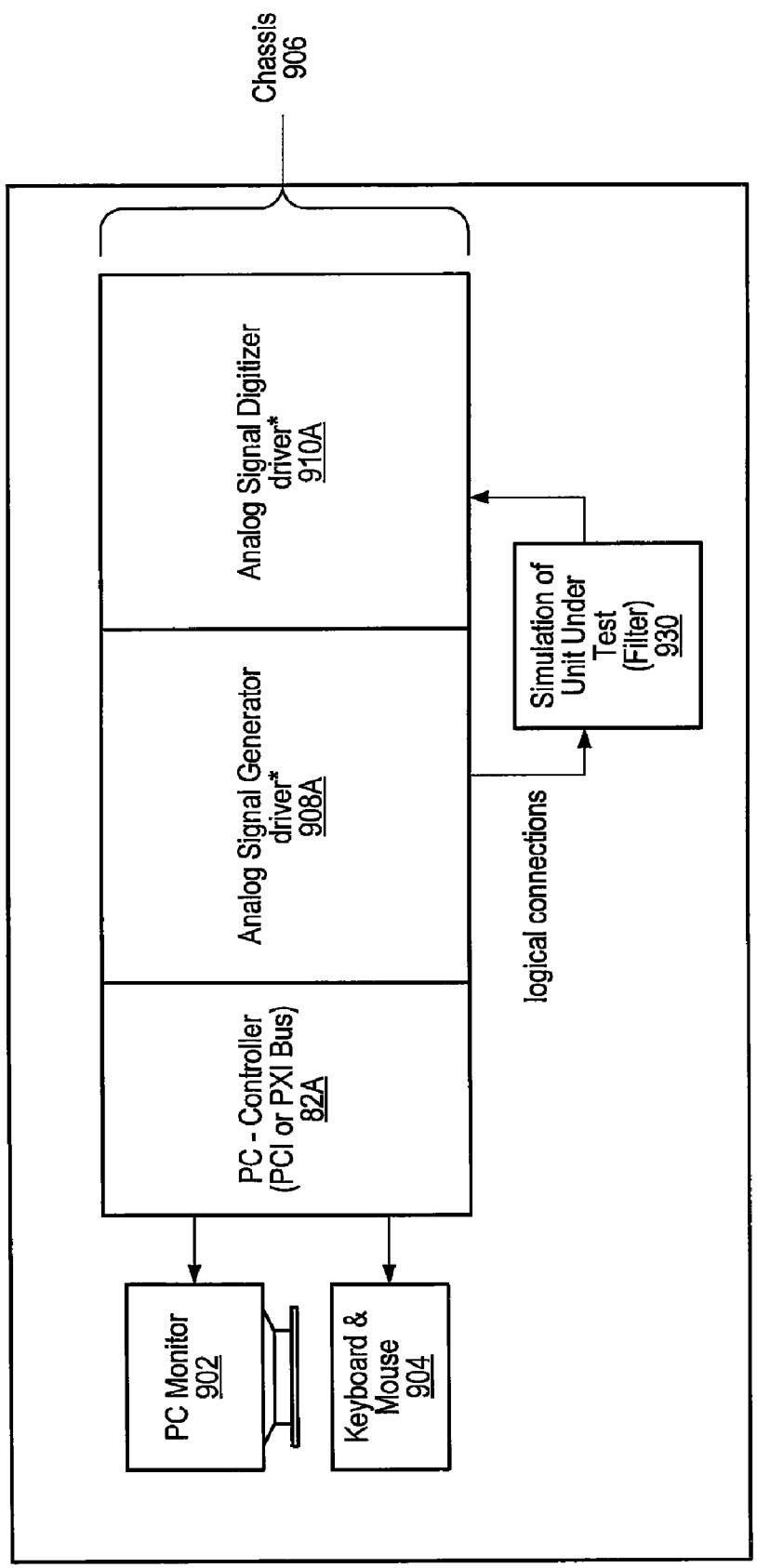

Turning now to FIG. 9B, a configuration of the system is shown where the hardware UUT has been replaced with a simulation of the UUT 930, e.g., a simulation of the LC-Diode filter circuit of FIG. 9A, and where the analog generator 908 and analog signal digitizer 910 hardware has been bypassed. As may be seen, the driver software for each of these (bypassed) hardware components is retained and used to communicate and interact with the simulation UUT 930. Thus, in this example, all the component hardware, including the physical UUT, has been replaced with the simulation 930 (the simulation UUT). Note that the physical connections coupling the physical UUT with hardware components have been replaced with logical connections, e.g., logical communication paths between the driver programs and the simulation program executing on the controller, although in embodiments where the simulation executes on a computer system coupled to the controller, these communication paths may include network transmission media.

While in the embodiment of FIG. 9B, all the hardware components were disabled or bypassed, in some embodiments, there may be hardware components included in the system that can operate in conjunction with the simulation UUT 930, i.e., can communicate with the simulation.

Note that in some embodiments, the system may operate in "Continuous Execution" mode, where the function is executed even while further function blocks are being specified and/or configured, e.g., in 802, and so, in some embodiments, the configuration of the simulation in 806 may include pausing or stopping the execution prior to the actual configuring.

In 808, user input may be received specifying whether to use the physical or hardware UUT 920 or to use the simulation UUT 930. For example, the user may toggle the system between a hardware testing mode and a simulation mode, as indicated in 812. In one embodiment, the GUI may provide a button or menu item whereby the user may specify the mode (e.g., hardware or simulation) or UUT of the system, e.g., a "Simulation" button or equivalent that may be activated or deactivated by user input, thereby toggling between the hardware or physical UUT and the simulation UUT.

Thus, if the system is initially configured (and executing) in hardware mode, activating this feature may switch the system to simulation mode, where the executing signal analysis function may then be operable to interact with the simulation (e.g., of the hardware UUT) instead of the hardware UUT. In a preferred embodiment, the mode/UUT change simply redirects the I/O from the hardware UUT to the simulation or from the simulation to the hardware UUT, and is thus substantially transparent to the user. The switch between the hardware and the simulation may also be substantially transparent to the executing signal analysis function. For example, referring again to FIG. 9B, as noted above, the driver software for each of the bypassed hardware components is retained and used to communicate and interact with the simulation 930, and so from the perspective of the executing function, nothing has changed.

Once the UUT has been specified, the method may proceed to 810A or 810B, depending on which UUT was specified in 808, where, as FIG. 8 shows, if the simulation is specified as the UUT, the signal analysis function is executed with the simulation UUT, as indicated in 810A, and if the physical device is specified as the UUT, the signal analysis function is executed with the hardware or physical UUT, as indicated in 810B.

Note that in some embodiments, if the system is already executing and the simulation has not yet been configured, switching to the simulation UUT may automatically invoke the simulation configuration process of 806, described above. In some embodiments, the system may be able to switch back and forth between the hardware and simulation modes seamlessly, i.e., without pausing or stopping the function execution, although in other embodiments, this may not be the case, i.e., switching modes may entail (e.g., automatically) pausing or stopping the execution, and resuming execution once the mode/UUT is switched. Once the function is executing with respect to a given UUT, the function may continue executing with respect to that UUT until further user input is received changing the mode/UUT (or terminating the execution), as indicated in FIG. 8.

Thus, as indicated in 810A and 810B, the specified signal analysis function may be executed with the specified UUT, where results from the execution are preferably displayed in the GUI.

Figure 10E:
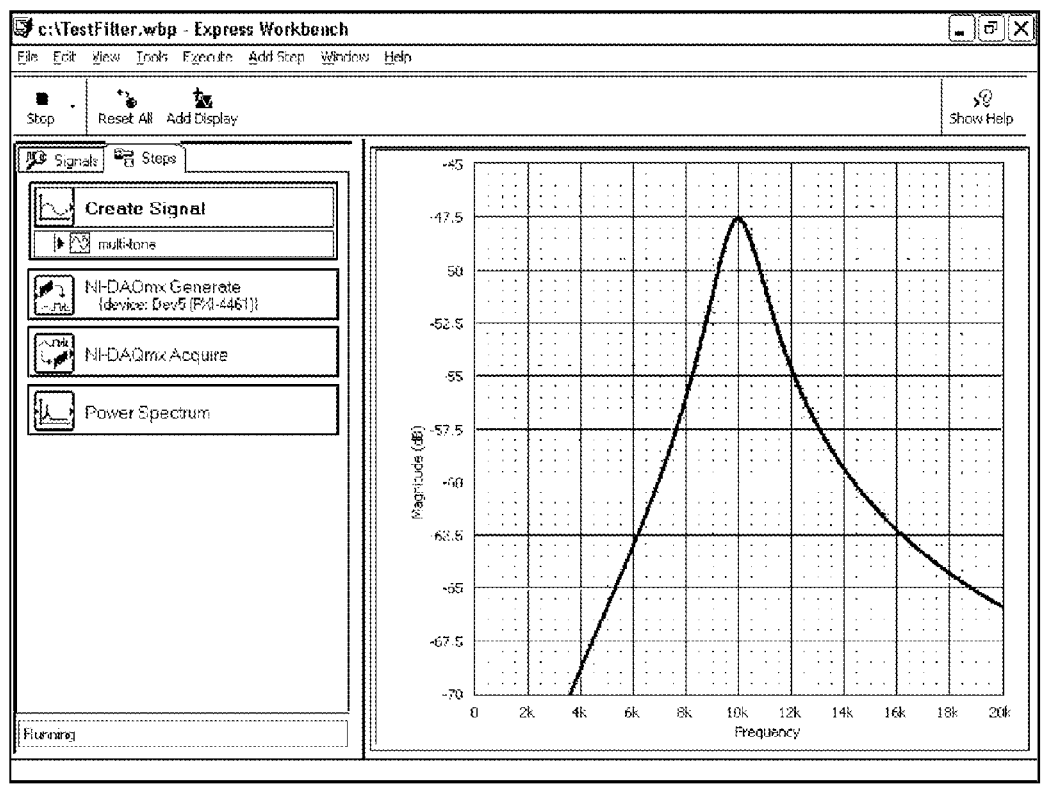

Referring again to FIG. 10A, as mentioned above, the power spectrum shown is for the hardware UUT (Device 5 (PXI-4461)). FIG. 10E illustrates an exemplary screenshot of the GUI displaying results from the execution of the signal analysis function specified by the function block sequence shown on the left side of the GUI, and where the system is in simulation mode, according to one embodiment. As may be seen by comparing this figure to FIG. 10A, the specified signal analysis function has not been changed. Rather, as described above, the I/O has been redirected per the simulation I/O mapping, and so the signal analysis function interacts with the simulation via the same driver programs used to interact with the hardware UUT.

Note that because the bypass or switching point occurs at the I/O stage of the hardware, the driver software interacts with the simulation in the same way that it does with the hardware components of FIG. 9A. As mentioned above, switching out hardware UUT (and possibly the hardware components) with the simulation UUT may be transparent to the software drivers, and the signal analysis function in general (and also the user). In other words, in preferred embodiments, the system configurations of FIGS. 9A and 9B may exist concurrently, where the signal analysis development environment is operable to switch between the two without having to modify or replace the specified signal analysis function.

Thus, the user may toggle the system between a hardware testing mode and a simulation mode, e.g., the user may initiate further UUT/mode switches, i.e., toggling between hardware testing and simulation or virtual testing, as desired. In this manner, the user may easily compare performance of the actual hardware UUT (and the signal analysis function) with that of the simulation UUT (and the signal analysis function).

It should be noted that while in the method described above, the system is configured to operate with the hardware UUT (physical device) first, then switched to operate the simulation UUT, in other embodiments, the simulation UUT may be tested first, and then the hardware UUT. In other words, the particular order of the configuration and testing of the hardware and simulated UUTs does not matter, so long as the system is configured properly prior to testing.

Data Snapshot

Comparing the results of FIGS. 10A and 10E, one can readily discern various differences between the two power spectrum plots by visual inspection. However, the fact that only one plot can be viewed at a time may limit analyses or conclusions based on viewing the results separately. These limitations lead one to contemplate logging the results for later analysis. However, most logging systems do not provide adequate and useful means for recording non-time-continuous data, e.g., power spectra, etc. In other words, most logging systems are directed to time-dependent data, and may not be suitable for displaying non-temporal-dependent data, such as data in the frequency domain. For example, in one prior art approach, time-dependent (i.e., time-continuous) data may be logged, and periodically, non-time-continuous data may be logged as well. However, logging discrete data along with time-continuous data is somewhat arbitrary and in some cases even nonsensical. In another prior art approach, the non-time-continuous data may be recomputed based on the logged time-continuous data. However, such computations can be intensive, and so this approach is wasteful and inefficient.

Thus, in some embodiments, a logging facility may be provided that allows single data "snapshots" to be taken, e.g., of non-time-continuous data, such as instantaneous frequency domain results. In other words, rather than logging non-time-continuous data along with time-continuous data, the user may log the non-time-continuous data, i.e., by taking data snapshots as needed or desired. In preferred embodiments, taking a data snapshot may include specifying a file name and location, whereby the data may be stored for later retrieval.

Figure 12:
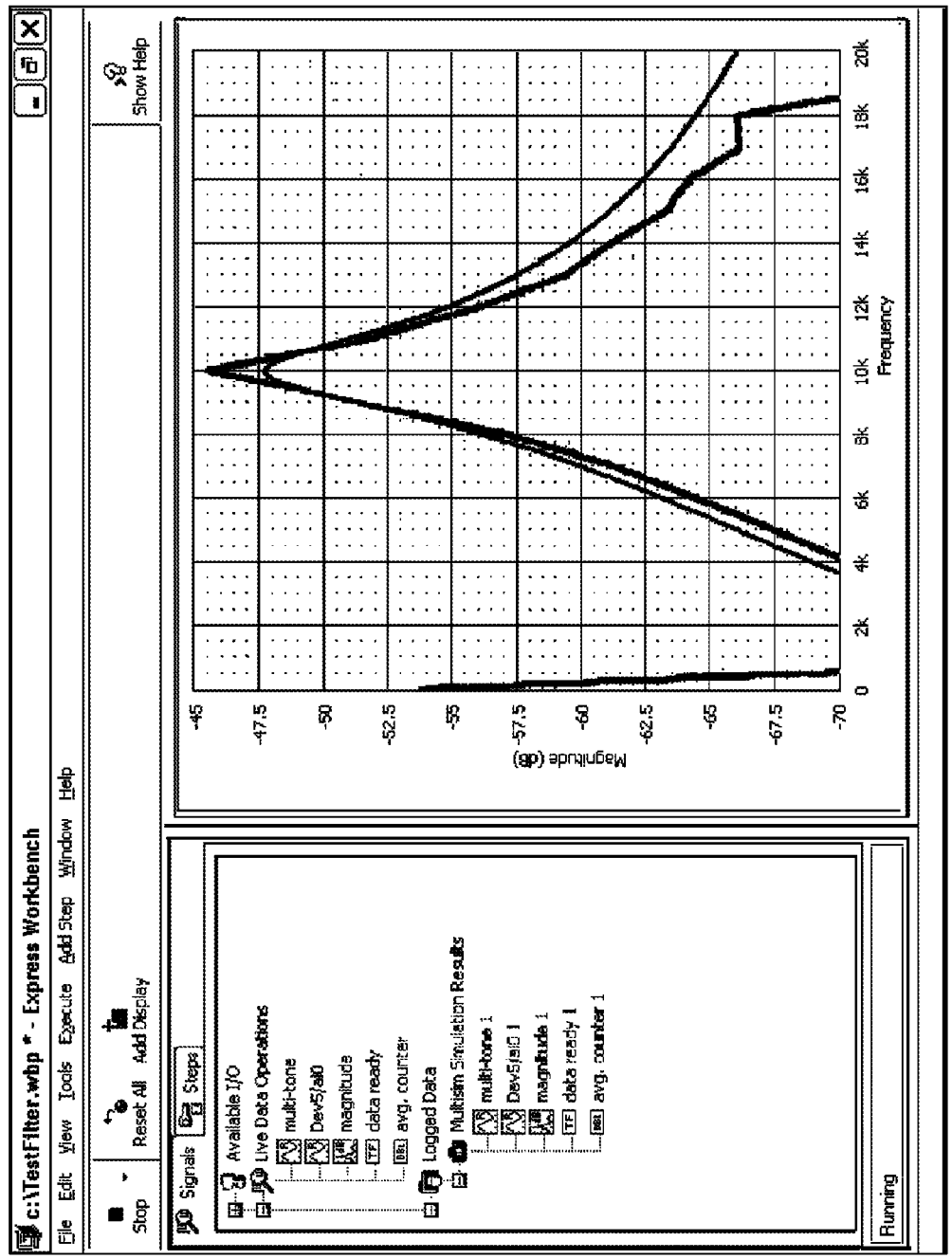
FIG. 12 illustrates use of a data snapshot, according to one embodiment.

FIG. 12 illustrates one embodiment of the signal analysis development environment where data snapshot functionality is supported. As FIG. 12 shows, in this example, data snapshots were taken of the power spectrum results from both the hardware UUT and simulation configurations described above with reference to the method of FIG. 8. In other words, the power spectrum results displayed in FIGS. 10A and 10E were logged as data snapshots, and retrieved for display in a single plot, i.e., overlaid, greatly simplifying comparative analysis of the data. Note that in the embodiment shown, a directory/file tree is displayed on the left side of the GUI, whereby logged data may be browsed, retrieved, and displayed.

Note that in addition to the data, e.g., signal analysis data, the data snapshot may include various other data, i.e., auxiliary data, such as, but not limited to, the time of the snapshot (i.e., timestamp), a title or other mnemonic for the data, configuration information, e.g., indicating the hardware and/or software configuration for the system, information describing the specified signal analysis function, possibly including a script or program implementing the function, information indicating the operator (user) at the time of the snapshot. Thus, the data snapshot may provide a simple quick alternative (or addition) to traditional data logging.

It should be further noted that while the data snapshot functionality shown is comprised in the signal analysis development environment, in other embodiments, this functionality may be used with any other test and/or analysis system as desired. For example, in some embodiments, the data snapshot functionality may be provided as a plug-in or as a standalone application, operable to function in conjunction with a data analysis or acquisition system or application.

Thus, various embodiments of the system and method may facilitate both hardware device testing and virtual testing, i.e., signal analysis directed to both hardware devices and simulations of hardware devices.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A non-transitory computer-readable memory medium comprising program instructions for developing a measurement program that performs a measurement function, wherein the memory medium is useable in a system comprising a display, wherein the program instructions are executable to implement:
    creating the measurement program in a development environment in response to first user input, wherein the measurement program comprises a plurality of icons that visually indicate the measurement function performed by the measurement program, wherein the measurement program is executable to receive signals from a physical unit under test (UUT);
    receiving second user input specifying that the measurement program is to receive simulated data that simulates the UUT instead of signals from the physical UUT;
    configuring the development environment to provide the simulated data to the measurement program in response to the second user input, wherein said configuring does not change the measurement program;
    executing the measurement program after said configuring, wherein during said executing the measurement program receives the simulated data and performs the measurement function on the simulated data;
    receiving third user input specifying that the measurement program is to receive signals from the physical UUT;
    configuring the development environment to provide the signals from the physical UUT to the measurement program in response to the third user input, wherein said configuring the development environment to provide the signals from the physical UUT to the measurement program does not change the measurement program; and
    executing the measurement program after said configuring the development environment to provide the signals from the physical UUT to the measurement program, wherein during said executing the measurement program receives the signals from the physical UUT and performs the measurement function on the signals from the physical UUT.

2. The non-transitory computer-readable memory medium of claim 1,
    wherein said creating the measurement program comprises configuring the physical UUT with one or more parameter values; and
    wherein said configuring the development environment to provide the simulated data comprises configuring the simulated data according to the one or more parameter values.

3. The non-transitory computer-readable memory medium of claim 2,
    wherein said configuring the development environment to provide the simulated data comprises configuring a simulator to generate the simulated data according to the one or more parameter values.

4. The non-transitory computer-readable memory medium of claim 1,
  wherein said configuring the development environment to provide the simulated data comprises receiving user input specifying a file from a memory, wherein the file contains the simulated data.

5. The non-transitory computer-readable memory medium of claim 4,
  wherein said creating the measurement program comprises configuring at least one measurement device with one or more parameter values; and
  wherein said configuring the development environment to provide the simulated data comprises receiving user input specifying a file from a memory, wherein the file contains the simulated data generated in accordance with the one or more parameter values.

6. The non-transitory computer-readable memory medium of claim 4,
  wherein said creating the measurement program comprises configuring at least one measurement device with one or more parameter values;
  wherein said configuring the development environment to provide the simulated data comprises receiving user input selecting a file from a memory; and
  wherein the program instructions are further executable to:
    examine the file to determine if the simulated data was generated in accordance with the one or more parameter values; and
    indicate that the simulated data was not generated in accordance with the one or more parameter values if the simulated data was not generated in accordance with the one or more parameter values.

7. The non-transitory computer-readable memory medium of claim 1,
  wherein the development environment is a graphical data flow program development environment; and
  wherein the measurement program comprises a plurality of interconnected icons forming a data flow diagram, wherein connections between the icons indicate that data produced by one icon is used by another icon.

8. The non-transitory computer-readable memory medium of claim 1,
  wherein each of the icons represents a respective portion of the measurement function; and
  wherein the plurality of icons are arranged to visually indicate an order of the respective portions of the measurement function.

9. The non-transitory computer-readable memory medium of claim 1,
  wherein said third user input is received during said executing the measurement program using the simulated data.

10. The non-transitory computer-readable memory medium of claim 1, wherein the program instructions are further executable to implement:
  executing the measurement program to measure the physical UUT prior to said configuring, wherein said executing the measurement program to measure the physical UUT comprises the measurement program receiving signals from the physical UUT;
  wherein said receiving second user input specifying that the measurement program is to receive simulated data is performed after said executing the measurement program to measure the physical UUT.

11. The non-transitory computer-readable memory medium of claim 10, wherein in response to the user input specifying that the measurement program is to receive simulated data, the program instructions are further executable to implement one or more of:
  pausing or stopping execution of the measurement program; and
  disabling the physical UUT.

12. The non-transitory computer-readable memory medium of claim 1,
  wherein said configuring the development environment to provide the simulated data to the measurement program comprises redirecting input to the measurement program from the physical UUT to a source of the simulated data.

13. The non-transitory computer-readable memory medium of claim 1,
  wherein the development environment comprises a driver for interfacing to the physical UUT;
  wherein said configuring the development environment to provide the simulated data to the measurement program comprises configuring the driver to provide the simulated data to the measurement program instead of data from the physical UUT.

14. The non-transitory computer-readable memory medium of claim 13,
  receiving third user input specifying that the measurement program is to receive signals from the physical UUT;
  configuring the driver to provide the signals from the physical UUT to the measurement program instead of the simulated data, wherein said configuring the driver to provide the signals from the physical UUT is performed in response to the third user input.

15. The non-transitory computer-readable memory medium of claim 1,
  wherein the development environment is operable to execute the measurement program in a continuous execution mode, wherein said creating the measurement program comprises:
    receiving user input specifying continuous execution of the measurement program; and
    receiving user input specifying each of a plurality of operations in the measurement program; and
  wherein the program instructions are further executable to implement:
    the measurement program executing as each operation is specified, wherein, after each operation is specified, the operation is performed substantially continuously.

16. A computer-implemented method for developing a measurement program that performs a measurement function, comprising:
  utilizing a computer to perform:
    creating the measurement program in a development environment in response to first user input, wherein the measurement program comprises a plurality of icons that visually indicate the measurement function performed by the measurement program, wherein the measurement program is executable to receive signals from a physical unit under test (UUT);
    receiving second user input specifying that the measurement program is to receive simulated data that simulates the UUT instead of signals from the physical UUT;
    configuring the development environment to provide the simulated data to the measurement program in response to the second user input, wherein said configuring does not change the measurement program; and executing the measurement program after said configuring, wherein during said executing the measurement program receives the simulated data and performs the measurement function on the simulated data;

receiving third user input specifying that the measurement program is to receive signals from the physical UUT;

configuring the development environment to provide the signals from the physical UUT to the measurement program in response to the third user input, wherein said configuring the development environment to provide the signals from the physical UUT to the measurement program does not change the measurement program; and executing the measurement program after said configuring the development environment to provide the signals from the physical UUT to the measurement program, wherein during said executing the measurement program receives the signals from the physical UUT and performs the measurement function on the signals from the physical UUT.

17. The computer-implemented method of claim 16,
wherein said creating the measurement program comprises configuring the physical UUT with one or more parameter values; and
wherein said configuring the development environment to provide the simulated data comprises configuring the simulated data according to the one or more parameter values.

18. The computer-implemented method of claim 17,
wherein said configuring the development environment to provide the simulated data comprises configuring a simulator to generate the simulated data according to the one or more parameter values.

19. The computer-implemented method of claim 16,
wherein the development environment is a graphical data flow program development environment; and
wherein the measurement function comprises a plurality of interconnected icons forming a data flow diagram, wherein connections between the icons indicate that data produced by one icon is used by another icon.

20. A measurement system, comprising:
a processor;
a memory medium coupled to the processor; and
a physical unit under test (UUT) coupled to the memory medium and the processor;
wherein the memory medium stores program instructions executable by the processor to:
create the measurement program in a development environment in response to first user input, wherein the measurement program comprises a plurality of icons that visually indicate the measurement function performed by the measurement program, wherein the measurement program is executable to receive signals from the physical unit under test (UUT);
receive second user input specifying that the measurement program is to receive simulated data that simulates the UUT instead of signals from the physical UUT;
configure the development environment to provide the simulated data to the measurement program in response to the second user input, wherein said configuring does not change the measurement program;
execute the measurement program after said configuring, wherein during execution the measurement program receives the simulated data and performs the measurement function on the simulated data receive third user input specifying that the measurement program is to receive signals from the physical UUT;

configure the development environment to provide the signals from the physical UUT to the measurement program in response to the third user input, wherein said configuring the development environment to provide the signals from the physical UUT to the measurement program does not change the measurement program; and execute the measurement program after said configuring the development environment to provide the signals from the physical UUT to the measurement program, wherein during said executing the measurement program receives the signals from the physical UUT and performs the measurement function on the signals from the physical UUT.

21. The system of claim 20,
wherein to create the measurement program, the program instructions are executable to configure the physical UUT with one or more parameter values; and
wherein to configure the development environment to provide the simulated data, the program instructions are executable to configure the simulated data according to the one or more parameter values.

22. A non-transitory computer-readable memory medium comprising program instructions for developing a signal analysis function, wherein the memory medium is useable in a system comprising a display, wherein the program instructions are executable by a processor to implement:
interactively specifying a plurality of operations of a signal analysis function via user input, wherein the signal analysis function is executable to send signals to and/or receive signals from a unit under test (UUT), wherein the plurality of operations comprise at least one of 1) generating signals displayed in a graph, and 2) modifying one or more signals displayed in the graph, and wherein the plurality of operations are represented by a respective plurality of icons arranged to visually indicate the signal analysis function;
executing the signal analysis function to generate and display signal analysis results for a first device, wherein the first device is specified as the UUT;
configuring a simulation for the signal analysis function, wherein the simulation is executable by a computer system to simulate a second device;
receiving user input specifying the simulation as the UUT instead of the first device;
in response to the user input specifying the simulation as the UUT, executing the signal analysis function to generate and display signal analysis results for the simulation;
receiving user input specifying that the signal analysis function is to receive signals from the first device as the UUT;
configuring the development environment to provide the signals from the first device to the signal analysis function in response to the third user input, wherein said configuring the development environment to provide the signals from the first device to the signal analysis function does not change the signal analysis function; and
executing the measurement program after said configuring the development environment to provide the signals from the first device to the signal analysis function, wherein during said executing the signal analysis function receives the signals from the first device and performs the signal analysis function on the signals from the first device.

23. The non-transitory computer-readable memory medium of claim 22,
wherein said creating the signal analysis function comprises configuring the first device with one or more parameter values; and
wherein said configuring the development environment to provide the simulated data comprises configuring the simulated data according to the one or more parameter values.

24. The non-transitory computer-readable memory medium of claim 23,
wherein said configuring the development environment to provide the simulated data comprises configuring a simulator to generate the simulated data according to the one or more parameter values.

25. The non-transitory computer-readable memory medium of claim 22,
wherein the development environment is a graphical data flow program development environment; and
wherein the signal analysis function comprises a plurality of interconnected icons forming a data flow diagram, wherein connections between the icons indicate that data produced by one icon is used by another icon.

26. A non-transitory computer-readable memory medium comprising program instructions for developing a measurement program that performs a measurement function, wherein the memory medium is useable in a system comprising a display, wherein the program instructions are executable to implement:
creating the measurement program in a development environment in response to first user input, wherein the measurement program comprises a plurality of icons that visually indicate the measurement function performed by the measurement program, wherein the measurement program is executable to receive signals from a physical unit under test (UUT), and wherein said creating the measurement program comprises configuring at least one measurement device with one or more parameter values;
receiving second user input specifying that the measurement program is to receive simulated data that simulates the UUT instead of signals from the physical UUT;
configuring the development environment to provide the simulated data to the measurement program in response to the second user input, wherein said configuring does not change the measurement program, wherein said configuring the development environment to provide the simulated data comprises receiving user input specifying a file from a memory, and wherein the file contains the simulated data;
examining the file to determine if the simulated data was generated in accordance with the one or more parameter values;
indicating that the simulated data was not generated in accordance with the one or more parameter values if the simulated data was not generated in accordance with the one or more parameter values; and
executing the measurement program after said configuring, wherein during said executing the measurement program receives the simulated data and performs the measurement function on the simulated data.

27. The non-transitory computer-readable memory medium of claim 26,
wherein said creating the measurement program comprises configuring the physical UUT with one or more parameter values; and
wherein said configuring the development environment to provide the simulated data comprises configuring the simulated data according to the one or more parameter values.

28. The non-transitory computer-readable memory medium of claim 27,
wherein said configuring the development environment to provide the simulated data comprises configuring a simulator to generate the simulated data according to the one or more parameter values.

29. The non-transitory computer-readable memory medium of claim 26,
wherein the development environment is a graphical data flow program development environment; and
wherein the measurement program comprises a plurality of interconnected icons forming a data flow diagram, wherein connections between the icons indicate that data produced by one icon is used by another icon.

30. The non-transitory computer-readable memory medium of claim 26,
wherein the file contains the simulated data generated in accordance with the one or more parameter values.

31. The non-transitory computer-readable memory medium of claim 26,
wherein each of the icons represents a respective portion of the measurement function; and
wherein the plurality of icons are arranged to visually indicate an order of the respective portions of the measurement function.

32. The non-transitory computer-readable memory medium of claim 26,
receiving third user input specifying that the measurement program is to receive signals from the physical UUT;
configuring the development environment to provide the signals from the physical UUT to the measurement program in response to the third user input, wherein said configuring the development environment to provide the signals from the physical UUT to the measurement program does not change the measurement program; and
executing the measurement program after said configuring the development environment to provide the signals from the physical UUT to the measurement program, wherein during said executing the measurement program receives the signals from the physical UUT and performs the measurement function on the signals from the physical UUT.

33. The non-transitory computer-readable memory medium of claim 32,
wherein said third user input is received during said executing the measurement program using the simulated data.

34. The non-transitory computer-readable memory medium of claim 26, wherein the program instructions are further executable to implement:
executing the measurement program to measure the physical UUT prior to said configuring, wherein said executing the measurement program to measure the physical UUT comprises the measurement program receiving signals from the physical UUT;
wherein said receiving second user input specifying that the measurement program is to receive simulated data is performed after said executing the measurement program to measure the physical UUT.

35. The non-transitory computer-readable memory medium of claim 34, wherein in response to the user input specifying that the measurement program is to receive simulated data, the program instructions are further executable to implement one or more of:
- pausing or stopping execution of the measurement program; and
- disabling the physical UUT.

36. The non-transitory computer-readable memory medium of claim 26,
wherein said configuring the development environment to provide the simulated data to the measurement program comprises redirecting input to the measurement program from the physical UUT to a source of the simulated data.

37. The non-transitory computer-readable memory medium of claim 26,
wherein the development environment comprises a driver for interfacing to the physical UUT;
wherein said configuring the development environment to provide the simulated data to the measurement program comprises configuring the driver to provide the simulated data to the measurement program instead of data from the physical UUT.

38. The non-transitory computer-readable memory medium of claim 37,
receiving third user input specifying that the measurement program is to receive signals from the physical UUT;
configuring the driver to provide the signals from the physical UUT to the measurement program instead of the simulated data, wherein said configuring the driver to provide the signals from the physical UUT is performed in response to the third user input.

39. The non-transitory computer-readable memory medium of claim 26,
wherein the development environment is operable to execute the measurement program in a continuous execution mode, wherein said creating the measurement program comprises:
- receiving user input specifying continuous execution of the measurement program; and
- receiving user input specifying each of a plurality of operations in the measurement program; and wherein the program instructions are further executable to implement:
the measurement program executing as each operation is specified, wherein, after each operation is specified, the operation is performed substantially continuously.

40. A computer-implemented method for developing a measurement program that performs a measurement function, comprising:
utilizing a computer to perform:
creating the measurement program in a development environment in response to first user input, wherein the measurement program comprises a plurality of icons that visually indicate the measurement function performed by the measurement program, wherein the measurement program is executable to receive signals from a physical unit under test (UUT);
receiving second user input specifying that the measurement program is to receive simulated data that simulates the UUT instead of signals from the physical UUT;
configuring the development environment to provide the simulated data to the measurement program in response to the second user input, wherein said configuring does not change the measurement program, wherein said configuring the development environment to provide the simulated data comprises receiving user input specifying a file from a memory, and wherein the file contains the simulated data;
examining the file to determine if the simulated data was generated in accordance with the one or more parameter values;
indicating that the simulated data was not generated in accordance with the one or more parameter values if the simulated data was not generated in accordance with the one or more parameter values; and
executing the measurement program after said configuring, wherein during said executing the measurement program receives the simulated data and performs the measurement function on the simulated data.

41. The computer-implemented method of claim 40,
wherein said creating the measurement program comprises configuring the physical UUT with one or more parameter values; and
wherein said configuring the development environment to provide the simulated data comprises configuring the simulated data according to the one or more parameter values.

42. A measurement system, comprising:
a processor;
a memory medium coupled to the processor; and
a physical unit under test (UUT) coupled to the memory medium and the processor;
wherein the memory medium stores program instructions executable by the processor to:
create the measurement program in a development environment in response to first user input, wherein the measurement program comprises a plurality of icons that visually indicate the measurement function performed by the measurement program, wherein the measurement program is executable to receive signals from the physical unit under test (UUT);
receive second user input specifying that the measurement program is to receive simulated data that simulates the UUT instead of signals from the physical UUT;
configure the development environment to provide the simulated data to the measurement program in response to the second user input, wherein said configuring does not change the measurement program, wherein said configuring the development environment to provide the simulated data comprises receiving user input specifying a file from a memory, and wherein the file contains the simulated data;
examine the file to determine if the simulated data was generated in accordance with the one or more parameter values;
indicate that the simulated data was not generated in accordance with the one or more parameter values if the simulated data was not generated in accordance with the one or more parameter values; and
execute the measurement program after said configuring, wherein during execution the measurement program receives the simulated data and performs the measurement function on the simulated data.

43. The system of claim 42,
wherein to create the measurement program, the program instructions are executable to configure the physical UUT with one or more parameter values; and
wherein to configure the development environment to provide the simulated data, the program instructions are executable to configure the simulated data according to the one or more parameter values.

\* \* \* \* \*